(12) United States Patent
Ruffini et al.

(10) Patent No.: US 11,864,139 B2
(45) Date of Patent: Jan. 2, 2024

(54) TRANSMITTING DEVICE, RECEIVING DEVICE AND METHODS PERFORMED THEREIN FOR HANDLING COMMUNICATION

(71) Applicant: Telefonaktiebolaget LM Ericsson (publ), Stockholm (SE)

(72) Inventors: Stefano Ruffini, Rome (IT); Magnus Sandgren, Staffanstorp (SE); Robert Baldemair, Solna (SE); Anders Höglund, Hägersten (SE); Mårten Wahlström, Hägersten (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 121 days.

(21) Appl. No.: 17/426,795

(22) PCT Filed: Jan. 30, 2020

(86) PCT No.: PCT/SE2020/050079
§ 371 (c)(1),
(2) Date: Jul. 29, 2021

(87) PCT Pub. No.: WO2020/159426
PCT Pub. Date: Aug. 6, 2020

(65) Prior Publication Data
US 2022/0141786 A1    May 5, 2022

Related U.S. Application Data

(60) Provisional application No. 62/799,099, filed on Jan. 31, 2019.

(51) Int. Cl.
*H04W 56/00*    (2009.01)

(52) U.S. Cl.
CPC ... *H04W 56/0015* (2013.01); *H04W 56/0045* (2013.01)

(58) Field of Classification Search
None
See application file for complete search history.

(56) References Cited

U.S. PATENT DOCUMENTS

2016/0095075 A1* 3/2016 Bin Sediq ........... H04W 56/001
                                                                370/350
2018/0348376 A1* 12/2018 Derbez ................... G01S 19/23
(Continued)

FOREIGN PATENT DOCUMENTS

WO    2018233563 A1    12/2018
WO    2019006368 A1    1/2019
(Continued)

OTHER PUBLICATIONS

Author Uknown, "3rd Generation Partnership Project; Technical Specification Group Services and System Aspects; Study on Communication for Automation in Vertical Domains (Release 16)," 3GPP TR 22.804 V16.2.0, Dec. 2018, 3GPP Organizational Partners, 196 pages.
(Continued)

*Primary Examiner* — Saad Khawar
(74) *Attorney, Agent, or Firm* — Christopher & Weisberg, P.A.

(57) ABSTRACT

A method performed by a transmitting device, for handling communication in a wireless communications network. The transmitting device transmits a Precision Time Protocol, PTP, message carrying synchronization information to a receiving device over a radio interface.

18 Claims, 19 Drawing Sheets

(56) References Cited

U.S. PATENT DOCUMENTS

2019/0229776 A1\* 7/2019 Cao .................. H04B 7/0617
2020/0244383 A1\* 7/2020 He ...................... H03M 9/00

FOREIGN PATENT DOCUMENTS

| WO | 2019168461 A1 | 9/2019 |
| WO | 2020104953 A1 | 5/2020 |
| WO | 2020111994 A1 | 6/2020 |
| WO | 2020111995 A1 | 6/2020 |

OTHER PUBLICATIONS

Author Unknown, 3rd Generation Partnership Project; Technical Specification Group Services and System Aspects; Study on enhancement of 5GS for Vertical and LAN Services (Release 16), 3GPP TR 23.734 V16.0.0, Dec. 2018, 3GPP Organizational Partners, 107 pages.
Author Unknown, 3rd Generation Partnership Project; Technical Specification Group Radio Access Network; Study on Integrated Access and Backhaul; (Release 15), 3GPP TR 38.874 V0.7.0, Nov. 2018, 3GPP Organizational Partners, 111 pages.
Author Unknown, "3rd Generation Partnership Project; Technical Specification Group Radio Access Network; Evolved Universal Terrestrial Radio Access (E-UTRA); Base Station (BS) radio transmission and reception (Release 15)," 3GPP TS 36.104 V15.3.0, Jun. 2018, 3GPP Organizational Partners, 279 pages.
Author Unknown, "3rd Generation Partnership Project; Technical Specification Group Radio Access Network; NR; Base Station (BS) radio transmission and reception (Release 15)," 3GPP TS 38.104 V15.4.0, Dec. 2018, 3GPP Organizational Partners, 208 pages.
Author Uknown, "3rd Generation Partnership Project; Technical Specification Group Radio Access Network; NR; Requirements for support of radio resource management (Release 15)," 3GPP TS 38.133 V15.4.0, Dec. 2018, 3GPP Organizational Partners, 876 pages.
Author Unknown, "ITU-T G.8271/Y.1366 Amendment 1: Time and phase synchronization aspects of packet networks," Mar. 2018, International Telecommunication Union, 44 pages.
Author Unknown, "ITU-T G.8271/Y.1366 Amendment 2: Time and phase synchronization aspects of packet networks," Jan. 2015, International Telecommunication Union, 14 pages.
Author Unknown, "ITU-T G.8275.1/Y.1369.1 Amendment 2: Precision time protocol telecom profile for phase/time synchronization with full timing support from the network," Mar. 2018, International Telecommunication Union, 70 pages.
Author Uknown, "P1588™/D1.4 Draft Standard for a Precision Clock Synchronization Protocol for Networked Measurement and Control Systems," Jul. 2018, The Institute of Electrical and Electronics Engineers, Inc., 530 pages.
CATT, "R2-1816360: PTP 1588 support in 5GS/TSN," 3GPP TSG-RAN WG2 Meeting #104, Nov. 12-16, 2018, Spokane, USA, 5 pages.
Nokia, "S2-1811828: KI#3.1—TSN—Definition of potential Impacts on Existing Nodes and Functionality of 5GS bridge model," SA WG2 Meeting #129bis, Nov. 26-30, 2018, West Palm Beach FL, 2 pages.
Qualcomm Incorporated, "R1-1900869: Discussion SA2 LS on RAN Impact analysis due to TSN," 3GPP TSG-RAN WG1 #AH-1901, Jan. 21-25, 2019, Taipei, Taiwan, 7 pages.
Qualcomm Incorporated, "S2-1901148: Time synchronisation using TSN directly in RAN," 3GPP TSG-SA WG2 Meeting #130, Jan. 21-25, 2019, Kochi, India, 5 pages.
International Search Report and Written Opinion for International Patent Application No. PCT/SE2020/050079, dated Apr. 30, 2020, 12 pages.
EPO Communication dated Oct. 18, 2023 for Patent Application No. 20704625.1, consisting of 9-pages.

\* cited by examiner

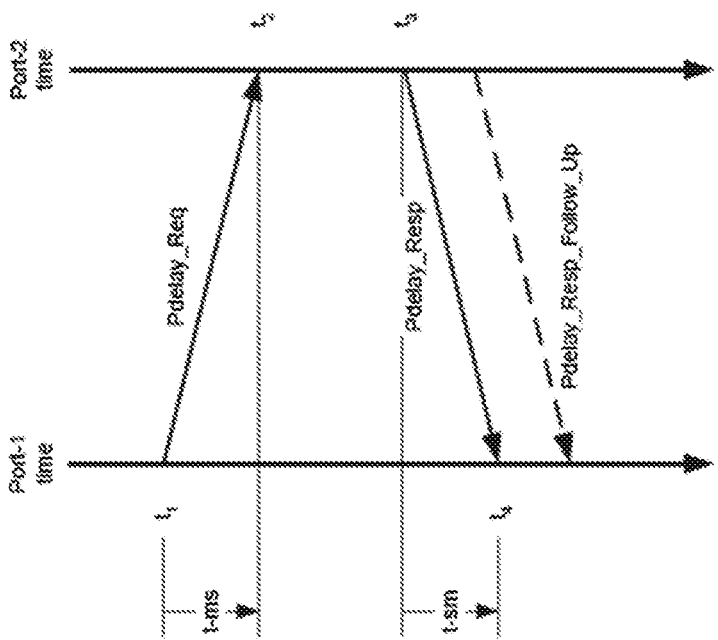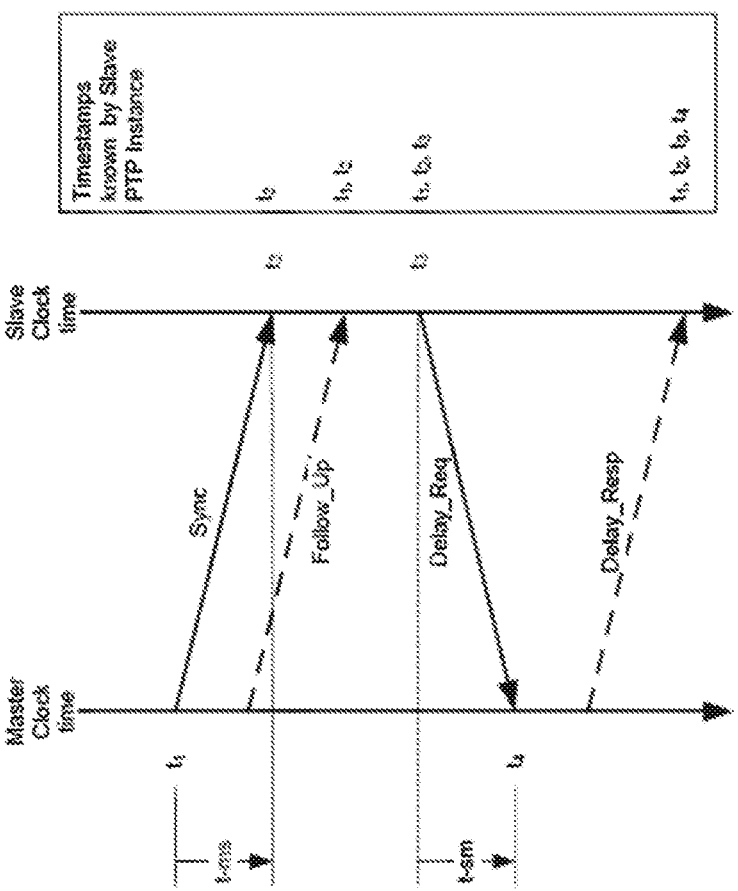
Fig. 1

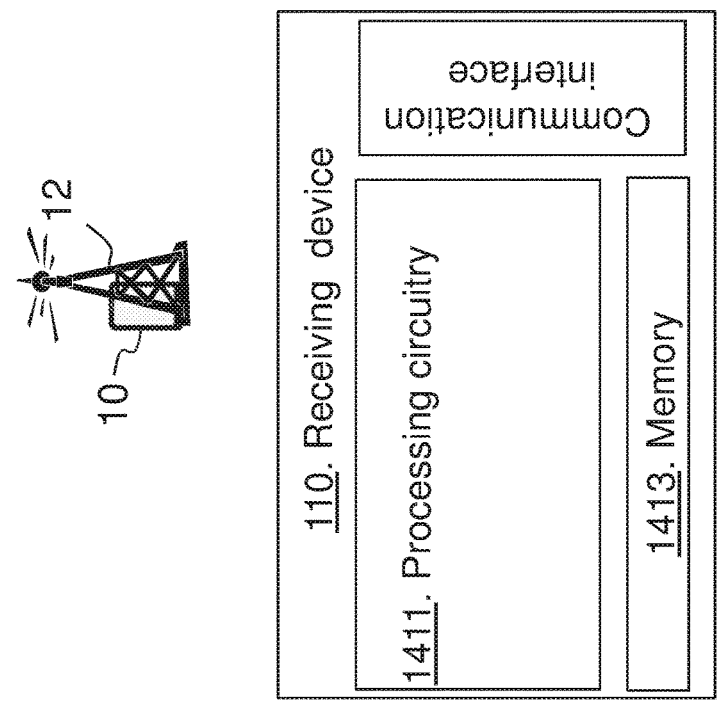
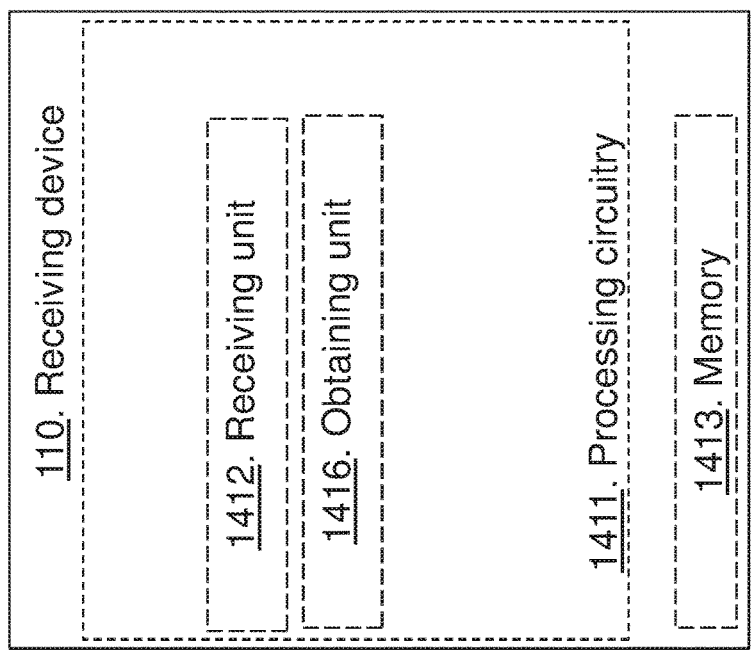
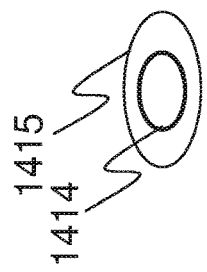
FIG. 14B

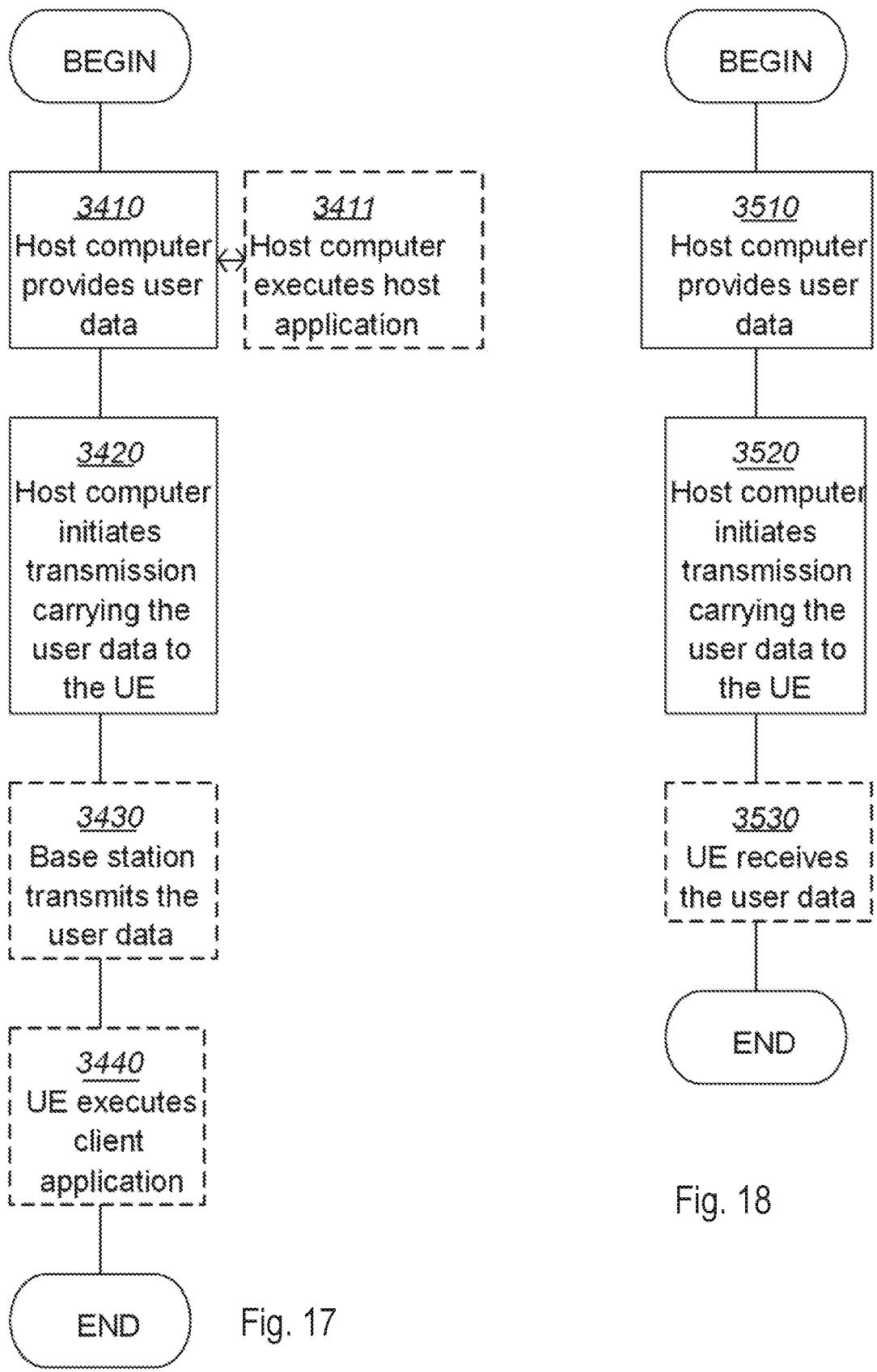

TRANSMITTING DEVICE, RECEIVING DEVICE AND METHODS PERFORMED THEREIN FOR HANDLING COMMUNICATION

This application is a 35 U.S.C. § 371 national phase filing of International Application No. PCT/SE2020/050079, filed Jan. 30, 2020, which claims the benefit of U.S. Provisional Application No. 62/799,099, filed Jan. 31, 2019, the disclosures of which are incorporated herein by reference in their entireties.

TECHNICAL FIELD

Embodiments herein relate to a transmitting device, a receiving device and methods performed therein regarding wireless communication. Furthermore, a computer program product and a computer readable storage medium are also provided herein. In particular, embodiments herein relate to handling communication, such as enable synchronization, in a wireless communications network.

BACKGROUND

In a typical wireless communications network, wireless devices, also known as wireless communication devices, mobile stations, stations (STA) and/or user equipment (UE), communicate via a Radio Access Network (RAN) with one or more core networks (CN). The RAN covers a geographical area which is divided into service areas or cell areas, with each service area or cell area being served by radio network node such as an access node e.g. a Wi-Fi access point or a radio base station (RBS), which in some networks may also be called, for example, a NodeB, a gNodeB, or an eNodeB. The service area or cell area is a geographical area where radio coverage is provided by the radio network node. The radio network node operates on radio frequencies to communicate over an air interface with the wireless devices within range of the radio network node. The radio network node communicates over a downlink (DL) to the wireless device and the wireless device communicates over an uplink (UL) to the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and this work continues in the coming 3GPP releases, such as 4G and 5G networks such as New Radio (NR). The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies such as new radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

In the evolution of 4G mobile technology towards 5G, there is an increased variety of services requiring that an accurate time and/or phase reference is available at a remote radio unit (RRU) or baseband unit (BBU) sites, with accuracy level dependent on the specific mobile service to be supported, for example (ref. 11):

- UTRA-time division duplex (TDD), LTE-TDD, NR-TDD: ±1500 ns
- Carrier Aggregation (Inter-band) time alignment error (TAE): 260 ns
- Observed Time Difference of Arrival (OTDOA): ±x-100 ns (x depending on the specific service requiring positioning)

To fulfil the above, mobile operators must carefully plan their synchronization networks.

These new synchronization networks usually exploit a time and/or phase synchronization reference coming from a Global Navigation Satellite System (GNSS) receiver placed either locally or remotely to the RBS site, in the latter case exploiting the IEEE 1588, i.e. Precision Time Protocol (PTP), ref. 1, capability to transport an accurate time and/or phase reference throughout a packet network.

The basic PTP messages exchange to deliver timing is shown in FIG. 1.

FIG. 1 shows the two options for measuring the link delay: via Delay_Req and Delay_Resp or via Pdelay_Req and Pdelay_Resp messages.

The importance of delivering accurate timing over the 3GPP radio interface is continuously increasing as an important complement to the earlier mentioned techniques but also to support new applications.

This methodology is commonly referred to as Radio Interface Base Synchronization (RIBS). One first application making use of RIBS concerns synchronizing RBSs that cannot be synchronized via the packet network due to lack of proper support for IEEE1588 in the transport network. In this case, the radio signal from adjacent RBSs themselves accurately synchronized, either by GNSS or by PTP, can be used to synchronize neighbor RBSs. FIG. 2 provides a solution to integrate a RIBS solution into a PTP network.

Note: Integrated Access-Backhauling (IAB), ref. 9, is one special case when sync over Radio shall be carried between gNBs in a relay manner.

A second more recent application area where it is important to define solutions where timing is carried over the 3GPP radio interface concerns the need to synchronize UEs that are used in applications such as Industrial Automation (IA) or Power Grid, and that are integrated into a 5G network.

In this case devices that normally receive synchronization via wired connection (e.g. using the IEEE802.1AS protocol, ref. 13, a sort of IEEE1588 profile), once the wired connection is replaced by a 5G wireless connection, will have to get synchronization over the air.

As an example, 3GPP TR 22.804 (ref. 12), Study on Communication for Automation in Vertical Domains (Ultra-reliable low latency communication (URLLC) Work Item), for the case of motion control, requires the 5G system to support a very high synchronicity between a communication group of 50-100 UEs in the order of 1 μs or below.

The requirement is explained in FIG. 3. Typically, a small portion of the overall requirement, can be allocated to the radio segment, e.g. between the gNB and the UE, with a budget typically in the order of 50-100 ns in order to meet 1 microsecond end-to-end. This implies dedicated support from the radio physical (PHY) layer.

Various solutions are being presented as related to the second use case e.g. Industrial Automation (IA) in the 3GPP SAs activities (see ref. S2-1811828, "TSN—Definition of potential Impacts on Existing Nodes and Functionality of 5GS bridge model", Nokia). As an example, the following FIG. 4 presents an approach being proposed where the 5G system is integrated in the IEEE802.1 AS chain, and internal radio connection carries sync via some internal sync over the air (OTA) techniques. Nokia proposal does not provide further details.

A solution where the clock of the 5G system is delivered via RIBS to the connected UE may be provided, and the UE generates the proper Precision Transparent Clock Protocol (PTCP) protocol, e.g., IEEE802.1AS, towards the connected devices, see FIG. 5, in practice acting as an interworking function (IWF) in terms of timing protocol. FIG. 5 shows an "IWF" solution for synchronizing IA devices.

Recent proposals address the need of delivering the IEEE802.1AS messages as an overlay over the 5G system, e.g. see 3GPP TR23.734 v. 16.0.0. These methods rely on keeping the UE in sync with the other network elements belonging to the 5G system e.g., user plane function (UPF), see FIG. 6. FIG. 6 shows delivery of IEEE 802.1 AS messages over a 5G system.

SUMMARY

There is a need of accurately synchronizing connected wireless devices or neighbor radio network nodes via the radio interface, and none of the methods listed earlier, provides a common way to accurately distribute timing via a standard protocol over a radio interface such as the 3GPP radio interface.

One approach concerns a method where the PTP is carried over the radio interface between e.g. a radio network node and a wireless device. No proposal has been made on a solution to allow accurate timing distribution by means of PTP over the radio yet.

Solutions have been suggested that address the need to integrate RIBS based solutions into a PTP network, but it refers to a solution where the radio link transports timing via some generic solution, e.g., internal LTE or 5G techniques, and wherein the signaling is exchanged over the fixed network. Other solutions provide e.g. a method to synchronize the IA devices, but do not allow the transparent transport of the Time Sensitive Networking (TSN) clock, in fact it only allows to lock the clock of the IA devices to the radio network node clock.

Embodiments are herein provided in order to avoid a lack of confidence in the use of these methods in the industry since a lack of a standard solution to deliver PTP over the radio interface may lead to that. Any radio vendor would define its own solution and such fragmentation in the market would result in complexity and additional operation costs for the network operators. Furthermore, interoperability between RBS vendors and wireless device vendors would not be guaranteed.

An object herein is to provide a mechanism to enable communication, e.g. synchronized communication, in an efficient manner in a wireless communications network.

According to an aspect the object is achieved, according to embodiments herein, by providing a method performed by a transmitting device, such as a radio network node or a wireless device, for handling communication in a wireless communications network. The transmitting device transmits a PTP message carrying synchronization information such as a time stamp, to a receiving device over a radio interface. The PTP message may comprise timing reference points that are defined using the frame borders or similar. Furthermore, a rate of PTP messages may define a relationship between reference timestamp points and system frequency SFN values. The synchronization information may be carried in a timing channel over a shared channel e.g. over a Physical Downlink Shared Channel (PDSCH). The transmitting device may provide, to the receiving device, information on a status, information carrying a current time, and/or information regarding delay. The synchronization information may be provided when there are relevant changes.

According to an aspect the object is achieved, according to embodiments herein, by providing a method performed by a receiving device, such as a radio network node or a wireless device, for handling communication in a wireless communications network. The receiving device receives over a radio interface a PTP message carrying synchronization information. The receiving device may then adjust time once the PTP message is received, wherein the timing reference points (as locked to the PTP master) may be used to keep the time for long periods without the need to receive sync message payload. The receiving device may further obtain, from the transmitting device, information on a status, information carrying a current time, and/or information regarding delay.

It is furthermore provided herein a computer program product comprising instructions, which, when executed on at least one processor, cause the at least one processor to carry out the method above, as performed by the transmitting device or the receiving device, respectively. It is additionally provided herein a computer-readable storage medium, having stored thereon a computer program product comprising instructions which, when executed on at least one processor, cause the at least one processor to carry out the method according to the method above, as performed by the transmitting device or the receiving device, respectively.

According to yet another aspect the object is achieved, according to embodiments herein, by providing a transmitting device, such as a radio network node or a wireless device, for handling communication in a wireless communications network. The transmitting device is configured to transmit a PTP message carrying synchronization information such as a time stamp, to a receiving device over a radio interface. The PTP message may comprise timing reference points that are defined using the frame borders. A rate of PTP messages may define a relationship between reference timestamp points and system frequency SFN values. The synchronization information may be carried in a timing channel over a shared channel e.g. over Physical Downlink Shared Channel (PDSCH). The transmitting device may be configured to provide, to the receiving device, information on a status, information carrying a current time, and/or information regarding delay. The synchronization information may be provided when there are relevant changes.

According to still another aspect the object is achieved, according to embodiments herein, by providing a receiving device, such as a radio network node or a wireless device, for handling communication in a wireless communications network. The receiving device is configured to receive over a radio interface a PTP message carrying synchronization information. The receiving device may be configured to then adjust time once the PTP message is received, the timing reference points (as locked to the PTP master) may be used to keep the time for long periods without the need to receive sync message payload. The receiving device may be configured to obtain, from the transmitting device, information on a status, information carrying a current time, and/or information regarding delay.

Embodiments herein provide a solution to carry standard PTP messages over the radio interface. This can be used for the following two use cases:
 radio network node—radio network node synchronization
 radio network node—UE synchronization The proposal includes solutions addressing some key challenges, e.g., guaranteed symmetricity over the radio interface, and control of the bandwidth used and provides an efficient solution.

An advantage is to provide a solution to carry PTP over the radio interface with proper accuracy that can be easily integrated into an overall synchronization solution where various methods can be implemented. With embodiments herein, the specific application area could define specific requirements, e.g., target performance, into e.g. an ad hoc "IEEE 1588" profile. The solution provides an optimized use of the spectrum using PTP messages for synchronization, thus, enables communication in an efficient manner in the wireless communications network.

BRIEF DESCRIPTION OF THE DRAWINGS

Embodiments will now be described in more detail in relation to the enclosed drawings, in which:

FIG. 1 is a schematic overview depicting PTP message exchange;

FIG. 14B is a block diagram depicting a transmitting device according to embodiments herein;

FIG. 17 is methods implemented in a communication system including a host computer, a base station and a user equipment in accordance with some embodiments;

FIG. 18 is methods implemented in a communication system including a host computer, a base station and a user equipment in accordance with some embodiments;

DETAILED DESCRIPTION

Figure 2:
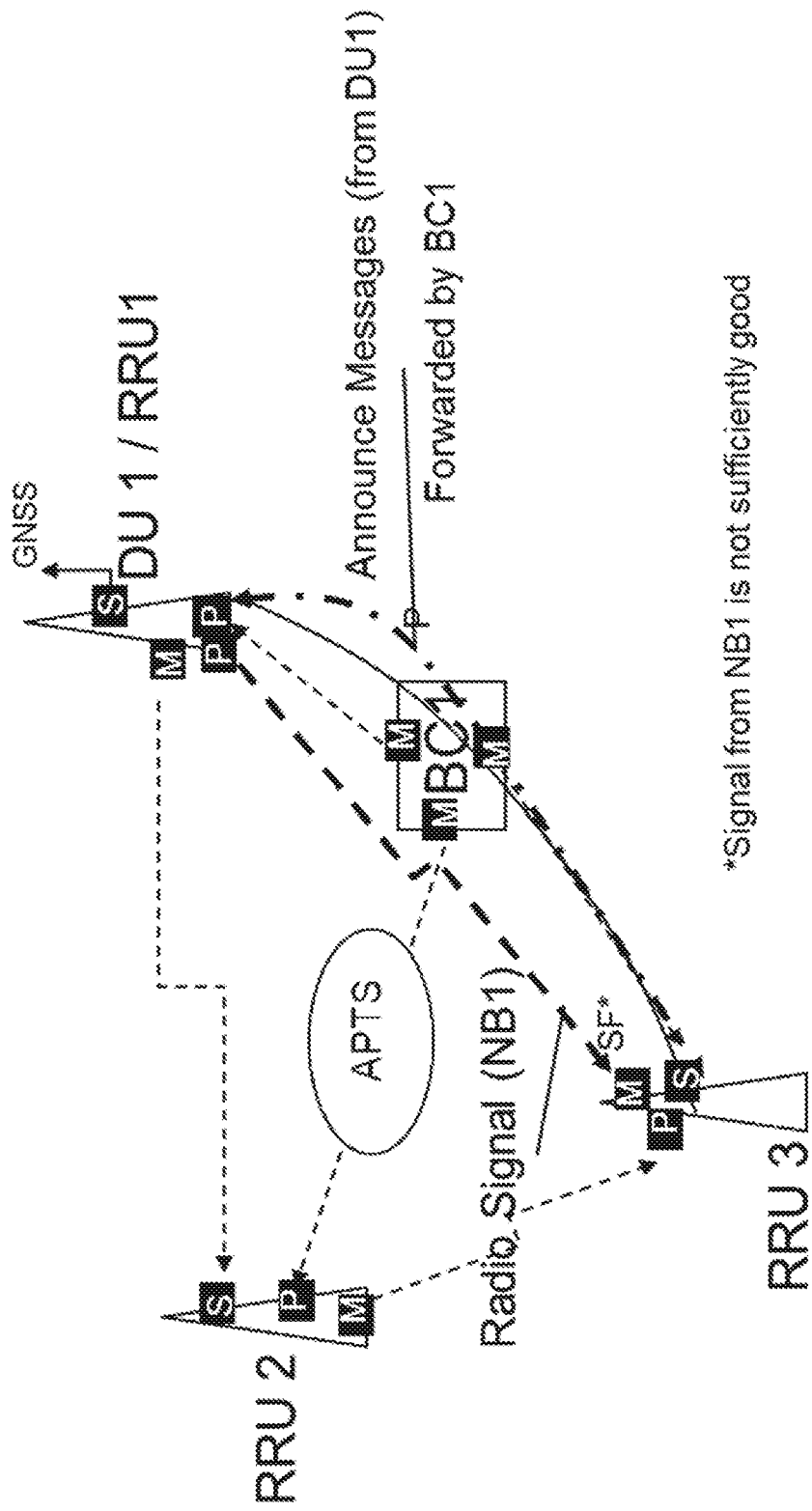
FIG. 2 is a schematic overview depicting integrating a RIBS solution into a PTP network.
Figure 3:
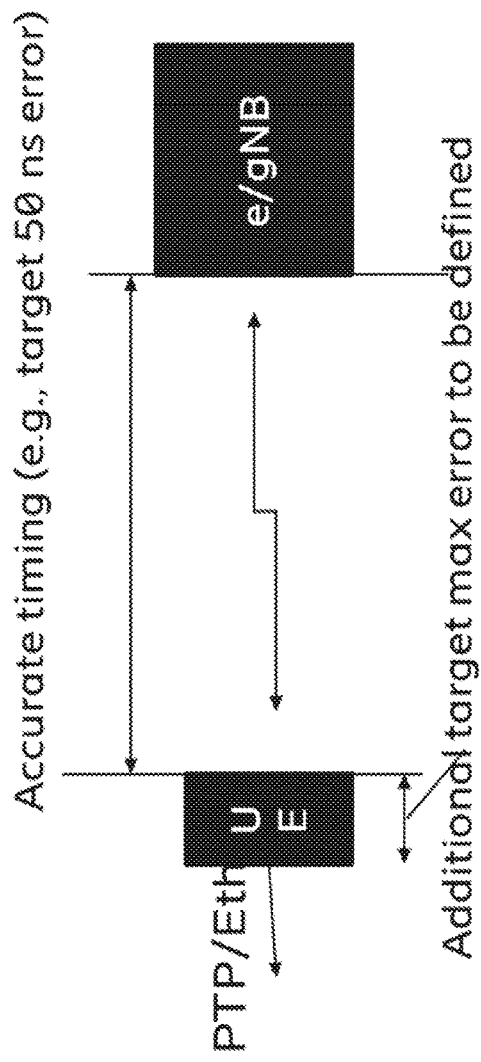
FIG. 3 is a schematic overview depicting an example of synchronization of a base station and a UE in a wireless communications network.
Figure 4:
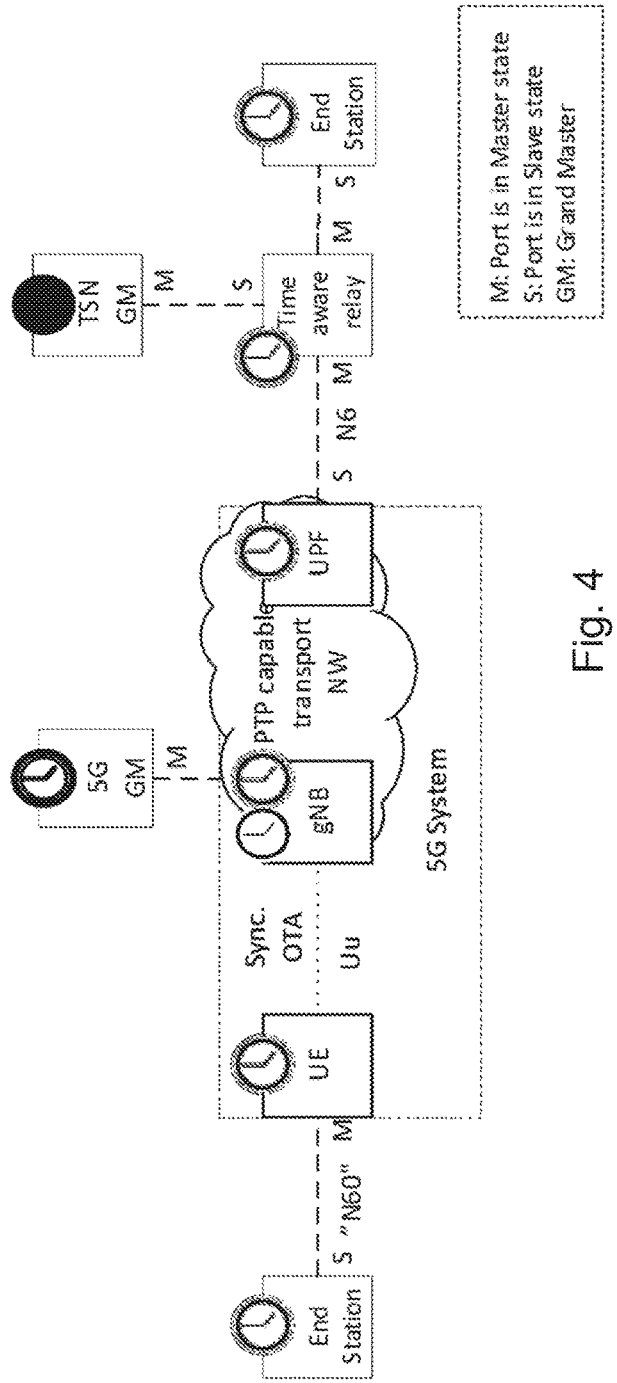
FIG. 4 is a schematic flowchart depicting a 5G system integrated in an IEEE802.1AS chain.
Figure 5:
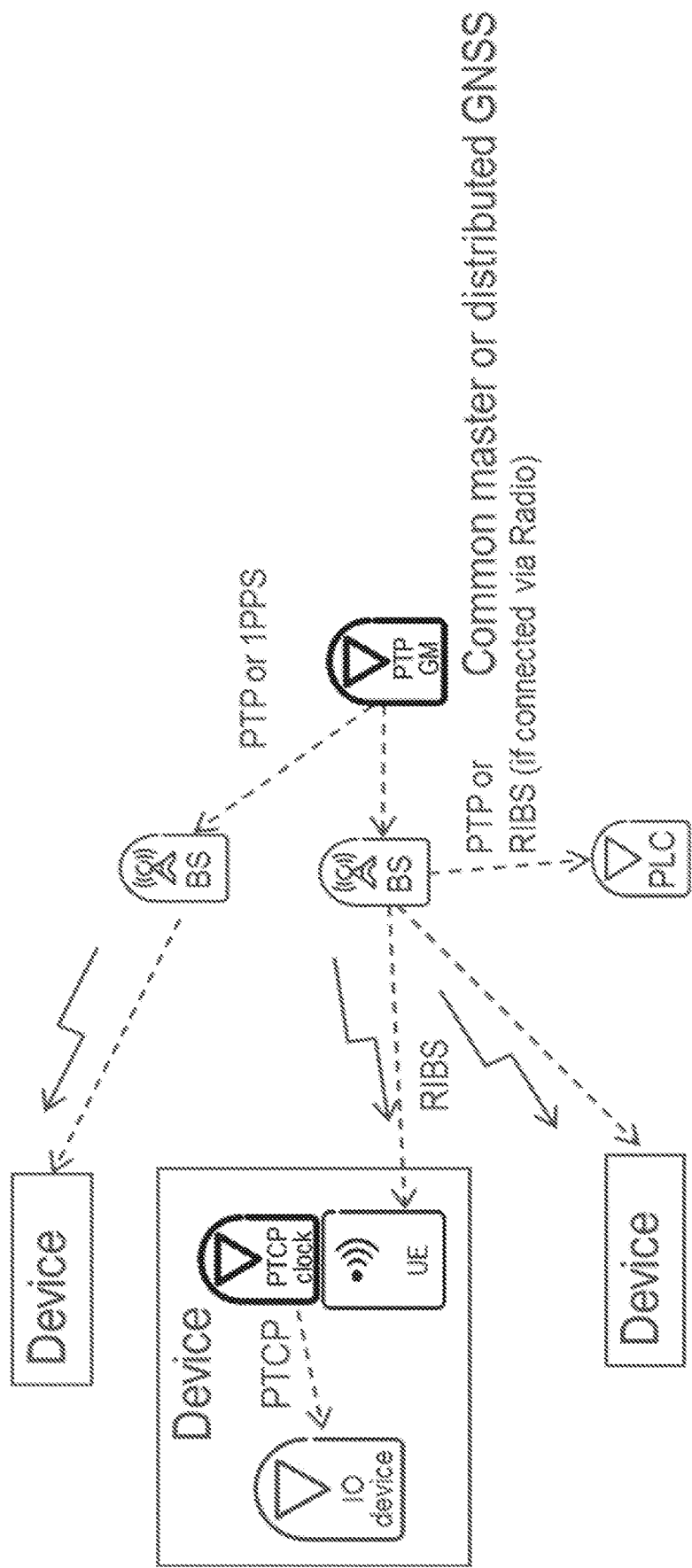
FIG. 5 is a schematic overview depicting a clock of a 5G system delivered via RIBS to a connected UE.
Figure 6:
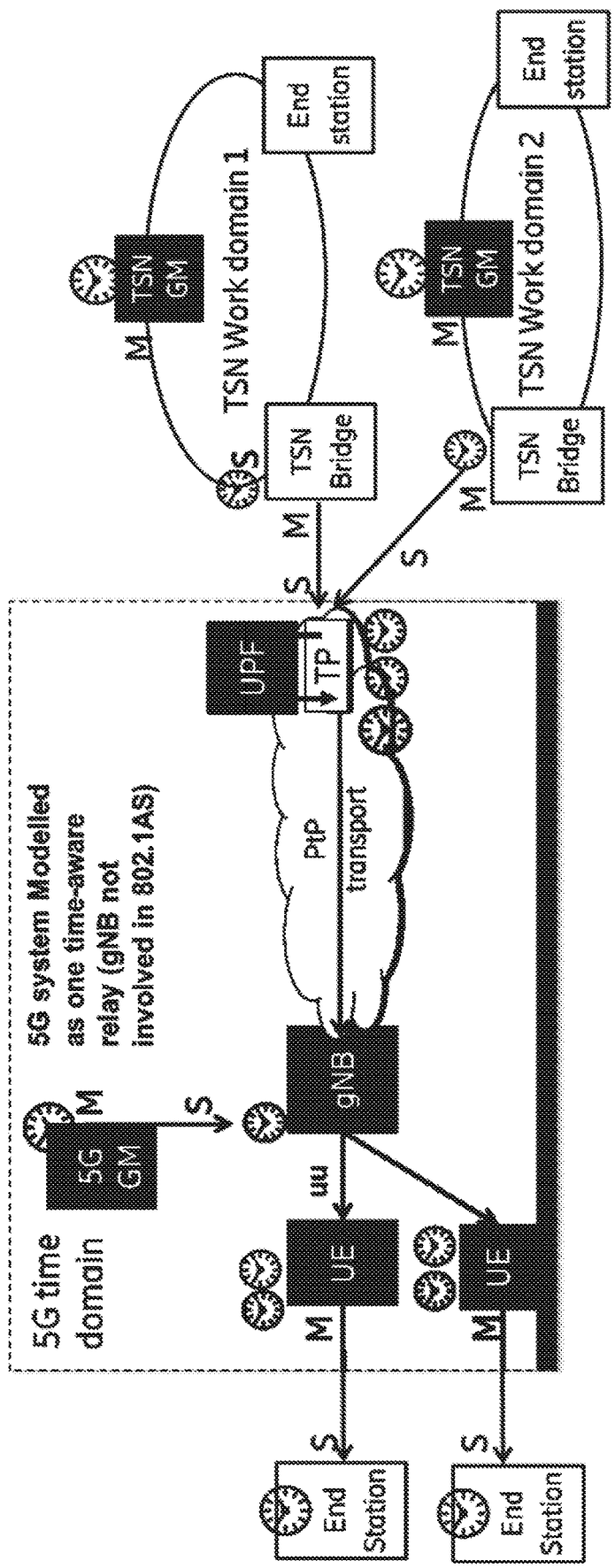
FIG. 6 is a schematic overview depicting delivery of IEEE 802.1 AS messages over a 5G system.
Figure 7:
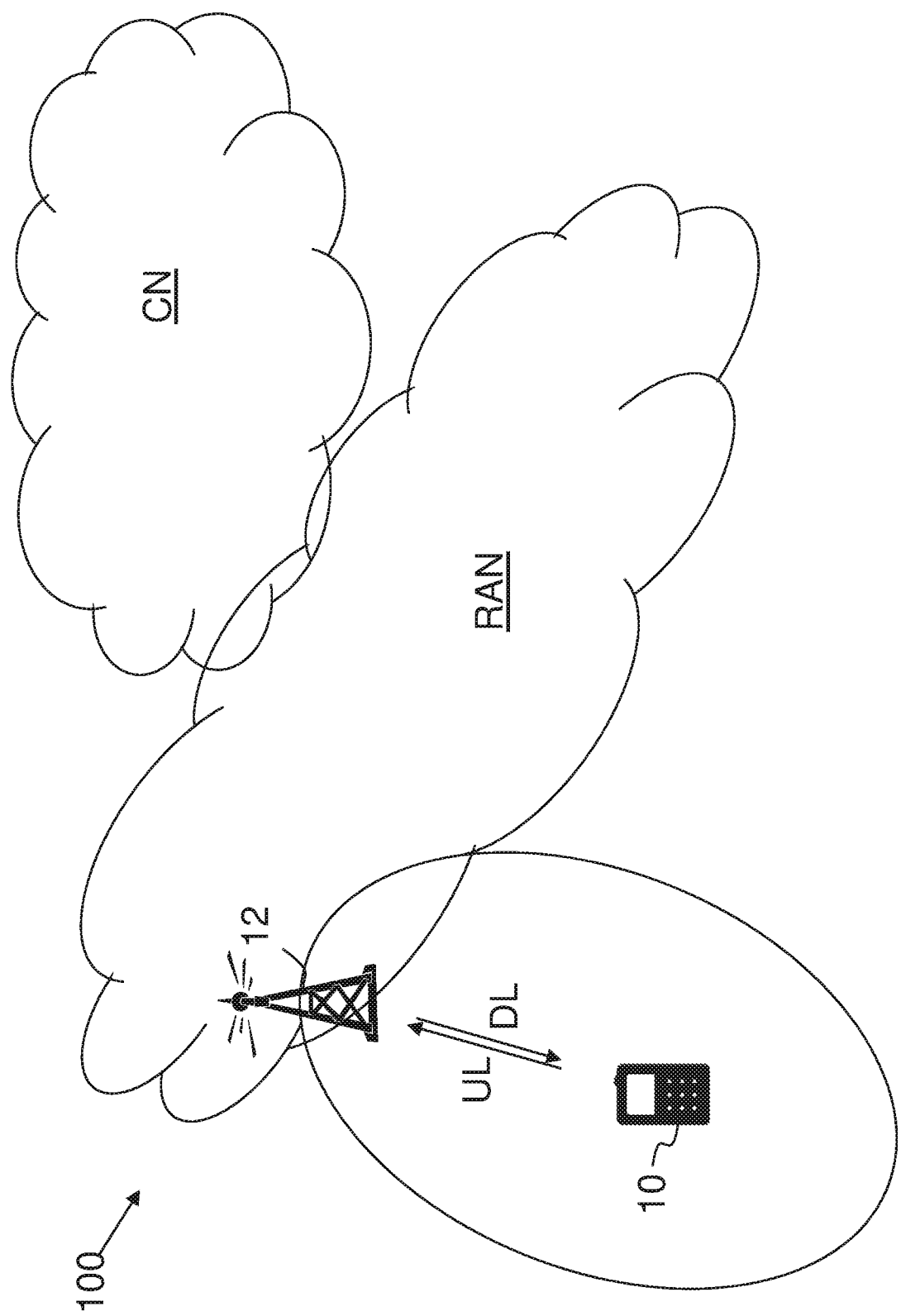
FIG. 7 is a schematic overview depicting a wireless communications network according to embodiments herein.

Embodiments herein relate to wireless communications networks in general. FIG. 7 is a schematic overview depicting a wireless communications network 100. The wireless communications network 100 comprises one or more RANs and one or more CNs. The wireless communications network 100 may use one or a number of different technologies. Embodiments herein relate to recent technology trends that are of particular interest in a New Radio (NR) context, however, embodiments are also applicable in further development of existing wireless communications systems such as e.g. LTE or Wideband Code Division Multiple Access (WCDMA).

In the wireless communications network 100, a receiving device 110 exemplified herein as a wireless device 10 such as a mobile station, a non-access point (non-AP) station (STA), a STA, a user equipment and/or a wireless terminal, is comprised communicating via e.g. one or more Access Networks (AN), e.g. RAN, to one or more core networks (CN). It should be understood by the skilled in the art that "wireless device" is a non-limiting term which means any terminal, wireless communications terminal, user equipment, narrowband-internet of things (NB-IoT) operable device, Machine Type Communication (MTC) device, Device to Device (D2D) terminal, or node e.g. smart phone, laptop, mobile phone, sensor, relay, mobile tablets or even a small base station capable of communicating using radio communication with a radio network node within an area served by the radio network node.

The wireless communications network 100 comprises a transmitting device 120 such as a first radio network node 12 providing radio coverage over a geographical area, a first service area, of a first radio access technology (RAT), such as NR, LTE, or similar. The radio network node may be a transmission and reception point such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the radio network node depending e.g. on the first radio access technology and terminology used. The radio network node may be referred to as a serving radio network node wherein the service area may be referred to as a serving cell, and the serving network node communicates with the wireless device in form of DL transmissions to the wireless device and UL transmissions from the wireless device. It should be noted that a service area may be denoted as cell, beam, beam group or similar to define an area of radio coverage.

The wireless device 10 is in the illustrated example the receiving device 110 and the first radio network node 12 is the transmitting device 120, however, it may be the other way around. Thus, the transmitting device 120 may be the wireless device 10, and the receiving device 110 may be the first radio network node 12.

According to embodiments herein the transmitting device 120, such as the radio network node 12, transmits a PTP message carrying synchronization information of over a radio interface to the receiving device 110, e.g. or a wireless device. In order to deliver PTP all the way across the radio network, some options may be defined that may guarantee high accuracy:

one may define a logical sync physical channel, with timestamp events aligned with a reference time instance, e.g. the frame boundaries, and the related timing information may either be carried in control channels or data channels. This solution implies the application of a radio interface which may be a media dependent interface compliant with PTP, see new 1588 edition;

PTP messages are clients of the radio channel and a time stamp may be scheduled where it should be sent so that accurate time stamping is possible;

PTP messages are clients of the radio channel and a physical layer notes when the PTP packet is passing, and may provide time information for a follow up message.

The following discussion focuses on the first approach. Similar requirements may apply for the other methods, but it is expected that they would likely require more complex implementations given the variable reference timestamping points.

According to the herein proposed method, the PTP operations in the radio network node 12 and in the UE 10 may be split into a PTP Media Independent function and a Media Dependent function according to the IEEE5188 Rev models. Embodiments herein may concern the way the media dependent functions are defined. In particular, basic time division multiplexing (TDM) operations of the radio frame are used to transfer PTP. As an example, timing reference points may be defined using the frame borders (start of a frame). Frames may have a 10 ms periodicity, and may be numbered with a counter called System Frame Number (SFN), that counts between 0 and 4095.

Figure 8:
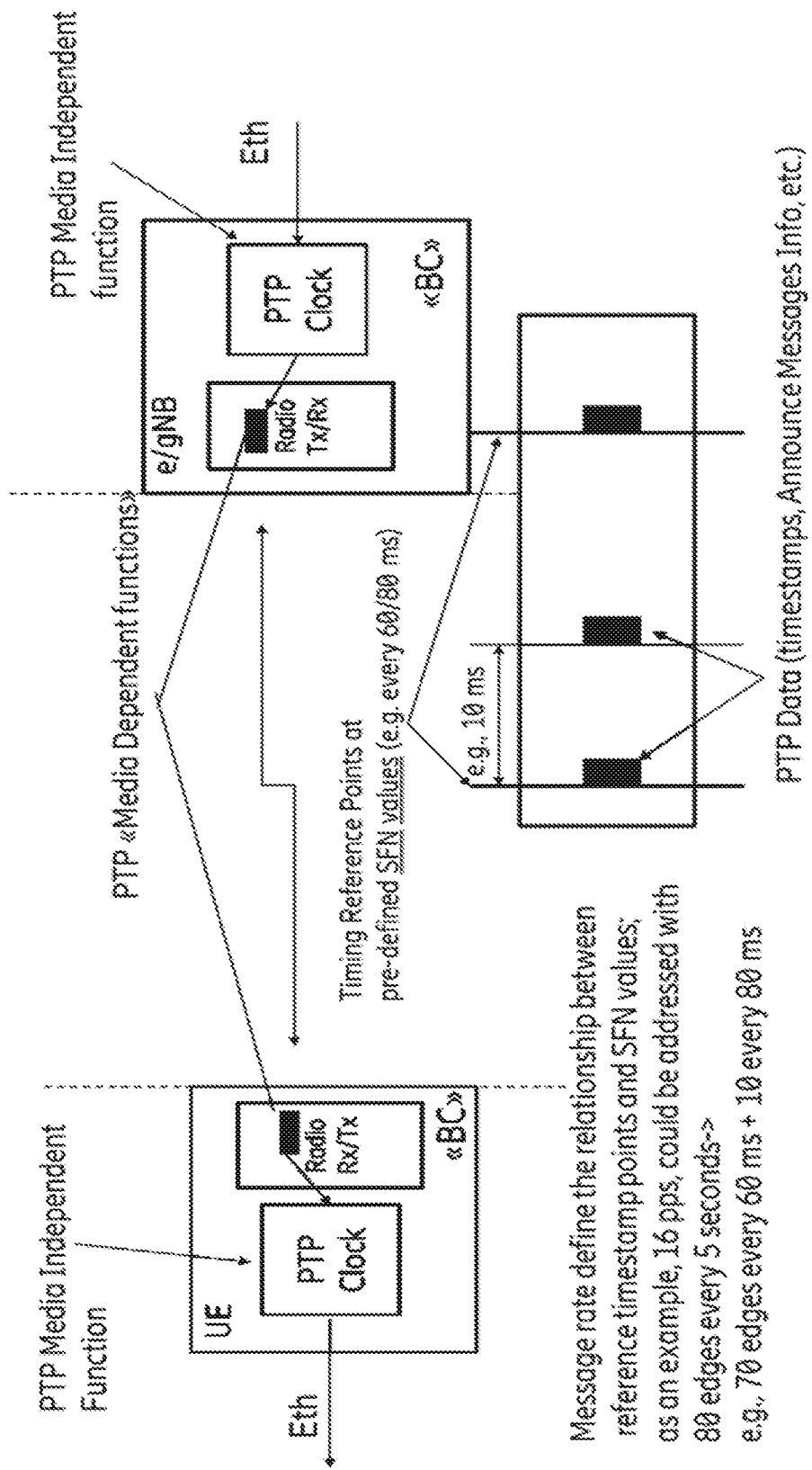
FIG. 8 is a schematic overview depicting a high level principle of a combination of event signals.

The PTP sync message rate may define the relationship between timing reference timestamp points and SFN values. As an example, in order to emulate a sync packet rate of 16 packet per seconds, this requires 80 edges, timestamping reference points, every 5 seconds. In terms of frames one example implementation would be 70 edges every 60 ms plus 10 edges every 80 ms, in fact, on average this would result in 16 packets per second (pps), see FIG. 8. FIG. 8 shows high level principle of the combination of event signals, timestamp reference points, and information data, e.g., timestamps. Anyone of these edges may be associated with a specific sync message.

In terms of performance the needed periodicity for the measurement of the delay depends mainly on e.g.:
1) Clock drift, Master clock and wireless device;
2) Radio channel allocation as part of complete end to end (E2E) budget;
3) Radio Frequency (RF) channel dynamics and mobility, e.g. impact delay compensation.

While 1) and 2) normally are static but would depend on individual radio network node- and wireless device-implementation characteristics, 3) could change dynamically and relates to that existing RF propagation delay compensation does no longer accurate reflect actual delays.

A trigger based on a threshold to detect RF channel changes through changes in uplink timing caused by channel variations and wireless device mobility may be implemented, since target accuracy for this part of the E2E budget is generally stricter than uplink timing adjustment through normal timing alignment (TA), which has a relation to a cyclic prefix (CP) which e.g. is ~4.7 us for a 15 kHz subcarrier spacing (SCS), and a lower threshold may be needed. In case of a positive trigger event an updating of the delay may be triggered by sending appropriate signaling to the wireless device 10.

High-mobility wireless devices may be detected through high doppler or a fast change in the wireless devices' UL receive timing and hence may be triggered more frequently to perform delay measurements. In addition or alternatively wireless devices may monitor DL receive timing and DL Doppler and autonomously update delay measurements.

For beamforming systems, a beam switch procedure before beam switch would serve as trigger to perform new and potentially more frequent RF propagation delay measurements. To ensure always up to date delay measurements and valid DL synchronization wireless devices may need to track two or more beams during beam switching and have valid delay measurements for each beam to ensure smooth adjustment during beam switching.

Compliance with a standard PTP profile requires message rate to be met, however as it will described later on with an example, it may not mean that all the information need to be sent continuously.

A two-way protocol may also be necessary to measure the link delay, e.g. radio channel delay. Finally additional PTP signaling and control messages may also need to be carried.

Some channels may be allocated in the radio frame for this purpose, timing channels denoted herein as a Physical Downlink Timing Channel (PDTCH) and a Physical Uplink Timing Channel (PUTCH) in order to carry all this information. In practice, as it will be shown with an example, a transport timing channel conveyed over an existing physical channel may be allocated for this purpose e.g. timing information over PDSCH.

Figure 9:
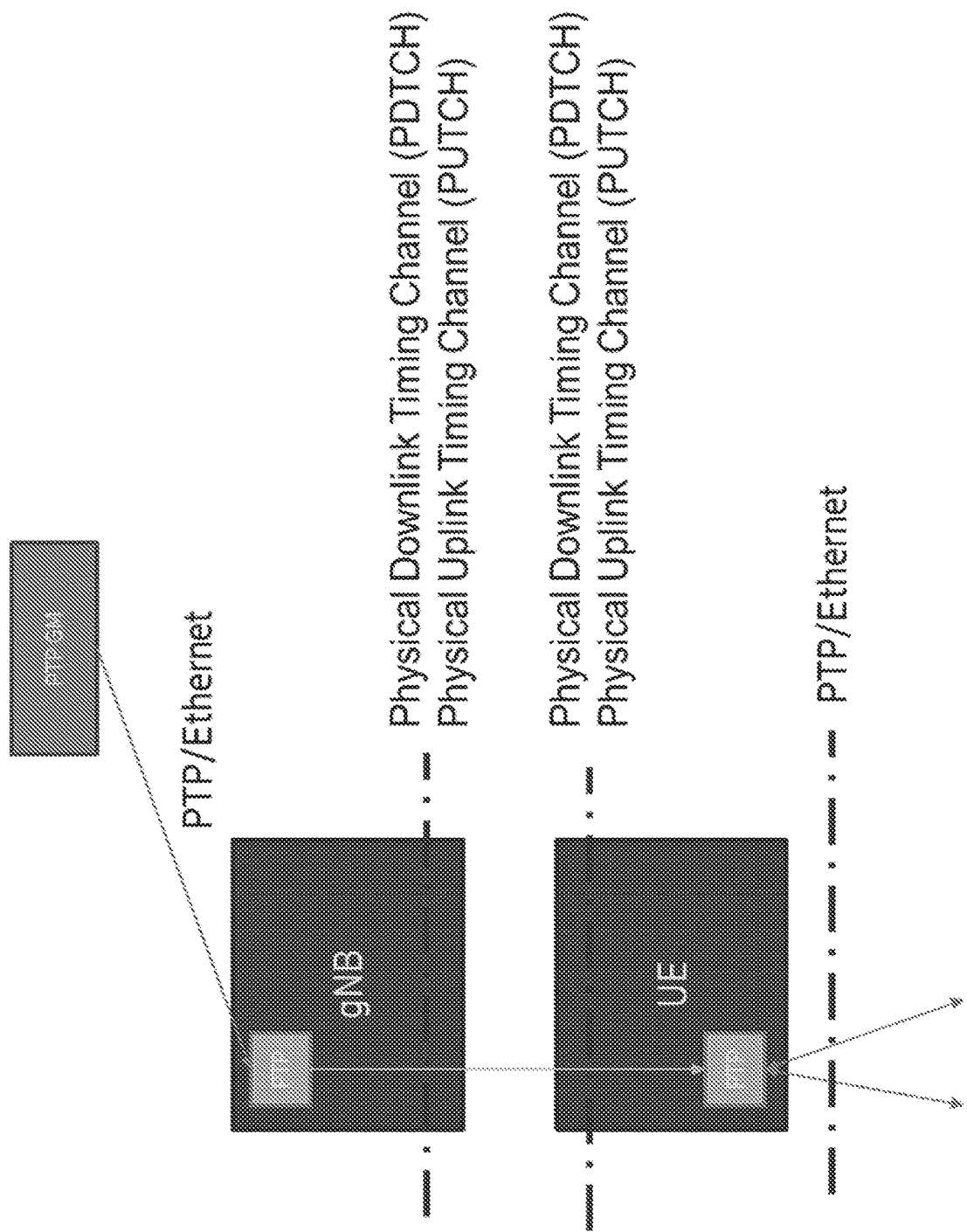
FIG. 9 is a schematic overview depicting information sent according to a PTP message exchange.

In terms of requirements, FIG. 9 shows what information is sent according to a simple replication of a PTP message exchange, as it will be shown later, some simplification is possible in order to optimize the use of bandwidth over the air:

information, e.g. unidirectional, on the status (information carried by the Announce messages e.g. Status of time source). This could be based on the "Time Announce Message" defined by G.8271 (Table A.4). This consists of 30 bytes and according to G.8275.1 can be sent once every ⅛ seconds (i.e. about 1.9 kbps)

information, e.g. unidirectional, carrying a current time, e.g. a time stamp. This can be based on the Time Event Message as defined by G.8271 (Table A.3). It consists of 14 bytes and is sent once every 1/16 seconds, I.e., about 1.8 Kbps Delay information such as a bidirectional protocol for peer delay messaging. G.8271 does not specify specific messages for that. However, the basic information could be based on the peer delay request and response messages as defined by IEEE1588, i.e., about 10 bytes. This information could be exchanged with a relatively slow rate if delay does not change over time, e.g. in this case 1 per second, with a total of 80 bits per second could be sufficient. Note: for example, when a wireless device moves with 3.6 km/h: When the wireless device 10 moves exactly towards to or away from the base station the propagation delay changes 50 ns every 15 sec. On the other hand, for the wireless device 10 that moves with 500 km/h, the propagation delay changes 50 ns every 0.1 seconds.

The overall capacity required is in the order of 4 kbps.

Figure 10:
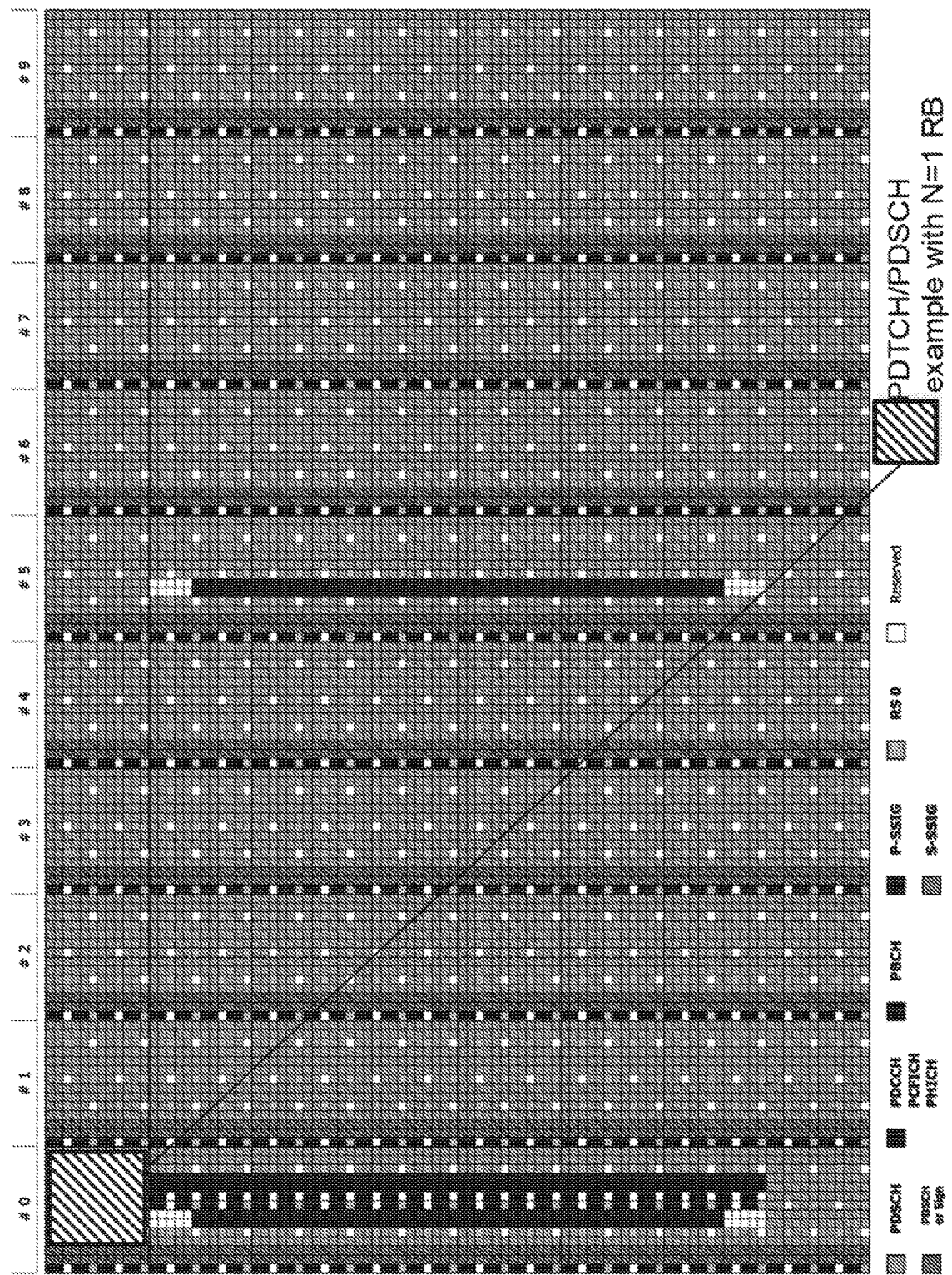
FIG. 10 is a schematic overview depicting an example of allocation of timing information in an LTE frame.

Example how to carry this information is shown in FIG. 10 as related to the LTE frame. FIG. 10 shows an example of allocation of the timing information in the LTE frame.

As shown in the example in FIG. 10, timing channel denoted the "PDTCH" is carried as a transport timing channel in the PDSCH, see diagonal striped resources, this may be considered similar to the method as described earlier; but in this case timestamping may be done using the start of the frame as timing reference point.

The capacity allocated to the timing channel, in Downlink and Uplink, may depend on the required PTP message rate.

16 messages per second as per earlier example, provides quite some flexibility, e.g. the actual timestamp and related information may have to be sent within 60/70 ms.

In this example, the timing channel may require about 40 bits every 10, i.e., 4 kbps; the timestamps, about 100 bits, may be sent within 60 ms, before the next timestamping reference point. Depending on the code rate one or a few LTE resource blocks may be needed every 10 ms.

If this results in a too large capacity, however, some optimization is possible as described later.

To measure the propagation delay, any kind of DL physical channels or signals may be used for wireless device measurements and UL physical channels or signals may be used for radio network node measurements. However, more preferable may use LTE cell specific reference signal (CRS), channel state information-reference signal (CSI-RS), positioning reference signal (PRS) for LTE DL or NR CSI-RS for NR DL and sounding reference signal (SRS) or physical random access channel (PRACH) for LTE and NR UL.

LTE: CRS span the system bandwidth and occur several times per ms and are therefore well suited for accurate timing measurements. Positioning Reference Signals (PRS) are designed for accurate timing measurements and may also be used. Even CSI-RS may be used.

NR: NR has Tracking Reference Signals (TRS)—a special CSI-RS configuration—which is used in NR for time and frequency tracking and may thus be used. TRS span min (54 RB, bandwidth part bandwidth) and are thus sufficiently wideband. Periodicity of TRS may be configured from once every 4 slots to once every 640 slots and may thus be adopted based on mobility. An NR slot is 1 ms, 0.5 ms, or 0.25 ms for 15, 30 kHz, or 60 kHz, respectively.

In UL both PRACH and SRS may be used. Given that PRACH is designed for unsynchronized wireless devices it may be preferable to use SRS which consumes less resources. SRS may be configured in bandwidth and periodicity and may thus also be adopted based on mobility.

When also payload should be included one may consider using physical uplink shared channel (PUSCH) or PDSCH transmissions for timing measurements. However, above mentioned reference signals have been designed for accurate measurements and are superior in performance over PUSCH or PDSCH. For accurate measurements, a wideband PUSCH or PDSCH may be required which may not be needed for the amount of data that needs to be communicated. Therefore, relying on PUSCH or PDSCH may be less preferred.

It may also be useful that both radio network node and wireless device measure propagation delay using the same definition. Preferable, radio network node and wireless device measure propagation delay based on the signal that arrives over the first channel path at the receiver, over a multi-path wireless channels multiple delayed versions of the signal arrive at the receiver. Typically standards would specify for the wireless device to measure propagation delay based on the first path while it would not be specified for the radio network node (but radio network node would have to use same definition for good performance). The wireless device may associate a reference signal it uses for transmission or reception in the delay measurement protocol with a time stamp. The same reference may be used by the base station. Various options are possible e.g. a few examples have been provided earlier.

Note: in case of beam formed systems it may be useful to ensure that wireless device uses the same RX and TX beam for transmission and reception of reference signals used in the delay measurement.

In terms of standardization, several aspects may need to be specified in order to allow interoperability between wireless devices and base stations from different vendors, e.g., which reference signals should be used.

The PTP related parameters may also need to be configured according to the specific IEEE 1588 profile to be used, including message rate and message formats.

Options for Capacity Optimization

Figure 11:
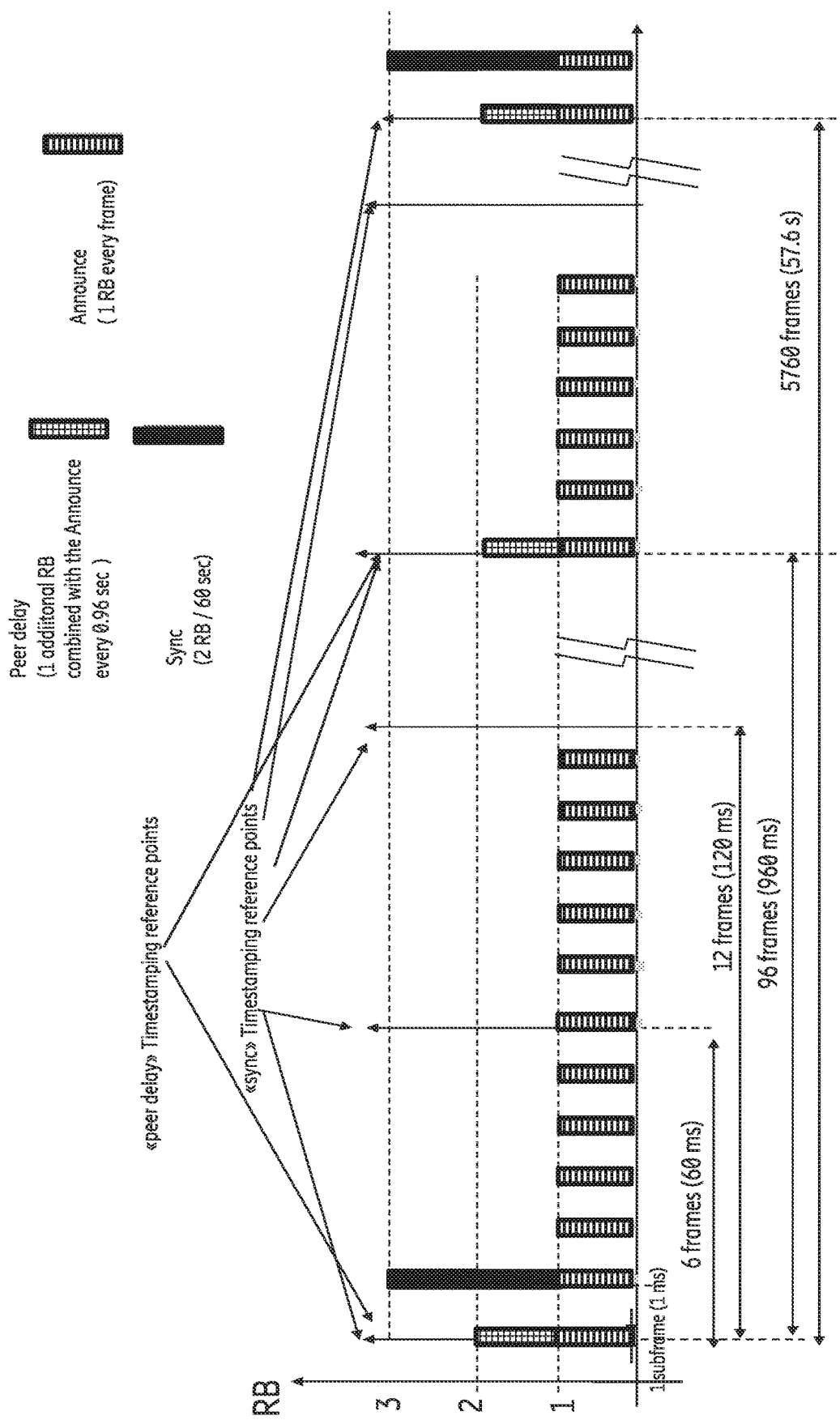
FIG. 11 is a schematic overview depicting an option for capacity optimization.

Optimization for radio network node to radio network node, e.g. e/gNB to e/gNB, or to not-moving wireless device sync, is shown in FIG. 11.

As a first consideration for reducing the use of the bandwidth, the TDM timing implies the possibility for a pseudo-holdover operation.

Once the sync message, e.g. the PTP message with the synchronization information, is received and time is adjusted, the radio frame precise timing (as locked to the PTP master) may be used to keep the time for long periods without the need to receive sync message payload (e.g., over 60 seconds, or when Announce messages changes).

Note: if the wireless device 10 is moving (or if there is a beam switch) higher frequency for the delay compensation may be required (e.g., 10 per seconds). This is further addressed below when describing optimization for the radio network node, e.g. gNB, to UE sync. Thus, by configuration if the receiving device, e.g. the wireless device 10, is moving, higher frequency for delay compensation may be required.

This means that the information on the origin timestamp may be sent with low periodicity, and with this assumption, the following requirements may apply:

Information on the status (information carried by the Announce messages). This may be based on the "Time Announce Message" defined by G.8271 (Table A.4). This comprises 30 bytes (i.e., 240 bits) and according to G.8275.1 may be sent once every ⅛ seconds (i.e. 1.9 kbps) (i.e., the information related to a specific Announce message could be sent within 120 ms)

Information carrying the current Time (sync message). This may be based on the "Time Event Message" as defined by G.8271 (Table A.3). It comprises 14 bytes (i.e., 112 bits): in normal operation it may be sent once every 60 seconds; (note in practice a multiple of 960 ms, 60×0.960 sec): it should be sent at most within 60 ms).

Delay information e.g. protocol for peer delay messaging. G.8271 does not specify specific messages for that. However, the basic information may be based on the peer delay request and response messages as defined by IEEE1588, i.e. 10 bytes (i.e., 80 bits). This information may be exchanged with a relatively slow rate (e.g. about 1 per second, say 0.96 sec, with a total of 80 bits per second in this case, but to be sent in a relatively short period, e.g. 120 ms).

With this optimization, the timing channel may be structured as follows:

about 20 bits every 10 ms (for the Announce messages). To transmit 20 bits assuming code rate 1/3 and quadrature phase shift keying (QPSK), would require one physical resource block (PRB), i.e. 1 PRBs every 10 ms. However, these bits may be combined with the 80 bits for the peer delay messaging (that are sent every second, but within 120 ms). In total 100 bits, i.e., with the same assumptions, 2 PRBS for the frames when both Announce and Peer delay messages must be sent (this happens once every 96 frames—0.96 sec).

112 bits for the sync message; assuming code rate 1/3 and QPSK, it requires 2 PRB, i.e. 2 PRBs (within the same frame) sent once about every 60 seconds (in practice to get a multiple of 960 ms, this would be 57.6 sec).

FIG. 11 thus shows PRBs allocation for the case of radio network node to radio network node sync or radio network node to not-moving wireless device sync.

Figure 12:
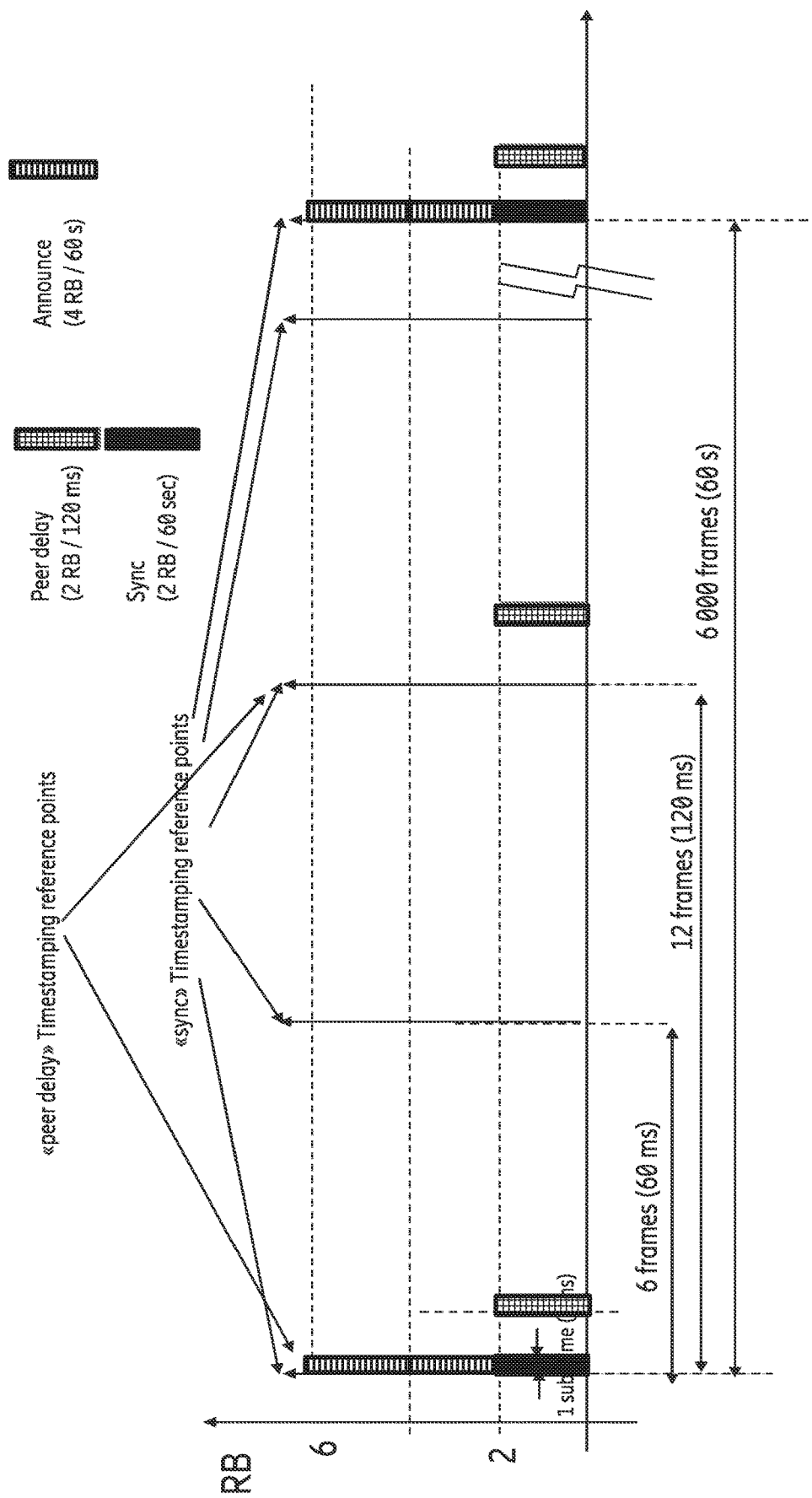
FIG. 12 is a schematic overview depicting another option for capacity optimization.

Optimization for radio network node, e.g. gNB, to wireless device sync, is shown in FIG. 12.

For the case of synchronization between the radio network node and the wireless device, it may be assumed that it is not required to exchange continuously Announce messages. E.g. when the sync hierarch is fixed, i.e. RBS to UE, sync is always in one direction, then frequency of the announce messages can be reduced, and also triggered by changes of the radio network, e.g., due to handover.

In fact, the hierarchy in this case may be considered statically defined (radio network node port set as Master, and wireless device as slave). And only low frequency messaging carrying relevant information only when there are relevant changes, e.g. entering holdover and changing clock-Class.

With this assumption the following applies (note, in this case the peer delay messaging may be assumed to be exchanged with some higher periodicity, e.g., about 9 times per second, in order to account for possible moving wireless devices):

information on the status (information carried by the Announce messages). This may be based on the "Time Announce Message" defined by G.8271 (Table A.4). This comprises 30 bytes and based on earlier consideration for the case of radio network node to wireless device sync, may be sent on average every 60 seconds (i.e., 4 bps). Assuming QPSK and code rate 1/3 4 PRB are needed every 60 seconds (to be sent in a short period e.g., within 120 ms).

information carrying the current Time (sync). This may be based on the Time Event Message as defined by G.8271 (Table A.3). It comprises 14 bytes: in normal operation it may be sent once every 60 seconds (e.g., about 2 bps). Assuming QPSK and code rate 1/3, 2 PRB are needed every 60 seconds (to be sent within 60 ms). Note: for analogy with the previous example, the periodicity may be chosen to be 57.6 seconds instead (i.e., 5760 frames).

delay information, such as bidirectional protocol for peer delay messaging. G.8271 does not specify specific messages for that. However, the basic information may be based on the peer delay request and response messages as defined by IEEE1588, i.e. 10 bytes. This information may be exchanged every 120 ms (e.g., with a total of about 700 bits per second in this case). Note as mentioned earlier, for a wireless device that moves with 500 km/h, the propagation delay changes 50 ns every 0.1 seconds Assuming quadrature phase shift keying (QPSK) and code rate 1/3, 1 to 2 physical resource block (PRB) are needed every 120 ms.

In case of sudden changes requiring sending updates (changes in the Announce messages) one additional resource block (RB) may be allocated as soon as possible.

The resulting scheme is shown in FIG. 12. FIG. 12 thus shows optimization for moving UE and fixed PTP hierarchy. Note, TDD technology may guarantee better performance in terms of control of asymmetry. Use of frequency division duplex (FDD) may require more sophisticated techniques to control asymmetry. This is further addressed below when describing control of radio asymmetry.

Control Performance on Radio Timestamping

The wireless device time stamp accuracy (time resolution of reference symbols) may depend on RS bandwidth (BW) and signal to noise ratio (SNR) and introduces a wireless device time estimation error as part of a complete wireless device budget.

$$\sigma \propto \frac{1}{\sqrt{\text{Total } SNR \times BW}}$$

Higher BW consumes more resources, dependent actual needs and relation to actual SNR an adaptive and configurable BW may be preferable. The BW may be negotiated as part of setting up the service.

Therefore, reference signals such as TRS and SRS for NR are attractive choices for delay measurements since they are configurable and thus only the overhead required by the environment is added. For LTE, CRS may be configured since these signals are anyway there. Also PRS (e.g. in DL) and SRS (e.g. in UL) may be used in LTE.

A radio network node, e.g. gNB/eNB, may configure reference signal parameters such as bandwidth and periodicity based on wireless device's mobility and SNR.

Control of Radio Asymmetry

DL and UL channels for the "Sync" and "Delay Req" may have to be selected consistently, e.g., quasi colocation/same beam, in order to achieve symmetry for the round trip time (RTT) delay measurements.

Uplink beam management to determine which wireless device TX beam (Delay_Req) to use may be determined through spatial relations where two options exists:

1) DL based: Based on a previously received DL reference signal (in this case the "sync" signal), this requires beam correspondence and would normally mean good symmetry (subject to 3GPP testing and associated with an error).

2) UL-based: Based on transmitted SRS.

Regarding option 1: In a beam-based NR system a concept called spatial relations may be used to make DL and UL paths as close as possible: A wireless device may be configured with different DL reference signals and for each reference signal the wireless device determines its best RX beam. This is a called a spatial relation. One of the spatial configurations is activated in the wireless device, i.e. the wireless device knows which RX beam to use to receive from the radio network node. If the wireless device also supports beam correspondence, it will use the same beam for transmission as it used for reception when the same spatial relation is activated. If a spatial relation is configured for the Sync signal (or for a another DL reference signal that is quasi-co-located with the Sync signal so that wireless device may use same RX beam (quasi-co-location Type D)) and the same spatial relation is activated when the Delay_Req is sent, wireless device will use the same beam to send Delay_Req as it used for receiving Sync. In addition, also gNB must use same beam for sending Sync and receiving Delay_Req.

Regarding option 2: In case the wireless device does not support beam correspondence the NW may need to assist the wireless device in finding the best UL TX beam. This is done by instructing the wireless device to send SRS using different beams and the NW determines—based on received SRS—which is the best wireless device TX beam. In a TDD network UL and DL propagation conditions are very similar, i.e. it is very likely that the determined UL TX beam (using a certain beam at the BS for reception) is same/similar to the wireless device RX beam the wireless device uses for reception of DL transmissions sent by the BS with the same/similar beam the BS uses for SRS reception. The UL TX beam found is then used for Delay_req transmission.

In addition to symmetry in the wireless channel it is also useful to ensure symmetry (same delays in DL and UL path) in the radio electronics. While this is often the case for TDD to enable reciprocity-based operation this has been less in focus for FDD. However, for accurate delay measurements in FDD symmetric delays need to be considered even for FDD.

Figure 13A:
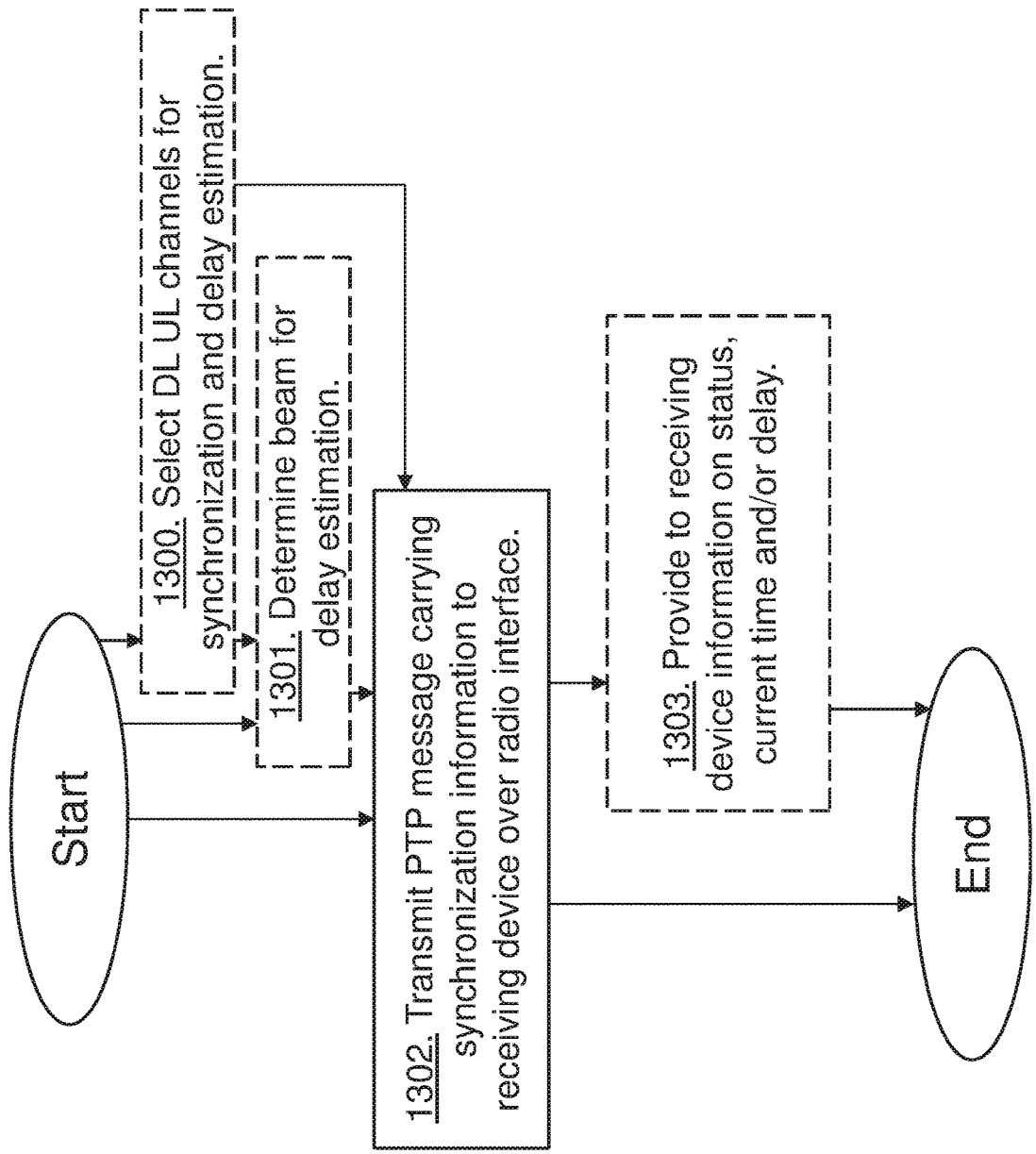
FIG. 13A is a schematic flowchart depicting a method performed by a transmitting device according to embodiments herein.

The method actions performed by the transmitting device 120 for handling communication in a wireless communications network 100 according to embodiments herein will now be described with reference to a flowchart depicted in FIG. 13A. The actions do not have to be taken in the order stated below, but may be taken in any suitable order. Actions performed in some embodiments are marked with dashed boxes.

Action 1300. The transmitting device 120 may select DL and UL channels for synchronization and delay estimation consistently in order to achieve symmetry for a RTT delay measurement. The transmitting device 120 may select DL and UL beams, done in a way that asymmetry, in delay, is minimized e.g. target is to have almost same delay in both direction. Removal of asymmetry is for accurate delay compensation.

Action 1301. The transmitting device 120 may determine which wireless device transmission beam to use for delay estimation by using spatial relations.

Action 1302. The transmitting device 120, such as a radio network node or a wireless device, transmits a PTP message carrying synchronization information, such as a time stamp, to a receiving device 110 over a radio interface. The PTP message may comprise timing reference points that are defined using the frame borders or a predefined position in a frame e.g. reference signals can also be used as references. A rate of transmission of PTP messages may define a relationship between reference timestamp points and system frequency number (SFN) values. The synchronization information may be carried in a timing channel over a shared channel e.g. carried over Physical Downlink Shared Channel (PDSCH). A rate of transmission of the PTP message may be related to mobility of the receiving device (110). The PTP message may not continuously be provided with the proviso that the transmitting device and the receiving device are in synchronization.

Action 1303. The transmitting device 120 may provide, to the receiving device 110, information on a status, a current time e.g. time stamp, and/or delay.

Figure 13B:
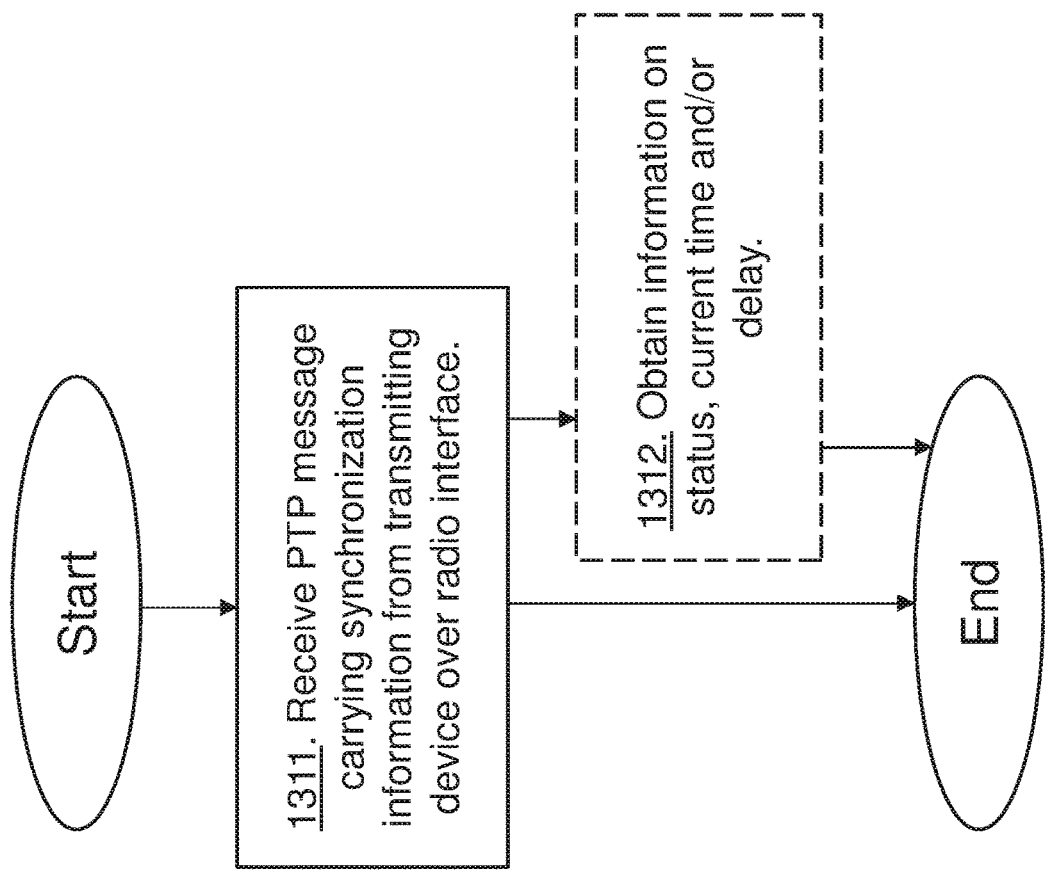
FIG. 13B is a schematic flowchart depicting a method performed by a receiving device according to embodiments herein.

The method actions performed by the receiving device 110 for handling communication in a wireless communications network 100 according to embodiments herein will now be described with reference to a flowchart depicted in FIG. 13B. The actions do not have to be taken in the order stated below, but may be taken in any suitable order. Actions performed in some embodiments are marked with dashed boxes.

Action 1311. The receiving device 110, such as a radio network node or a wireless device, receives, over a radio interface from a transmitting device 120, the PTP message carrying synchronization information. The receiving device 110 may then adjust time once the PTP message is received. Timing reference points (as locked to the PTP master) may be used to keep the time for long periods without the need to receive sync message payload. The transmitting device and/or the receiving device may perform delay measurements.

Action 1312. The receiving device 110 may obtain from the transmitting device or some other communication device, information on a status, information carrying a current time, and/or information on delay.

Figure 14A:
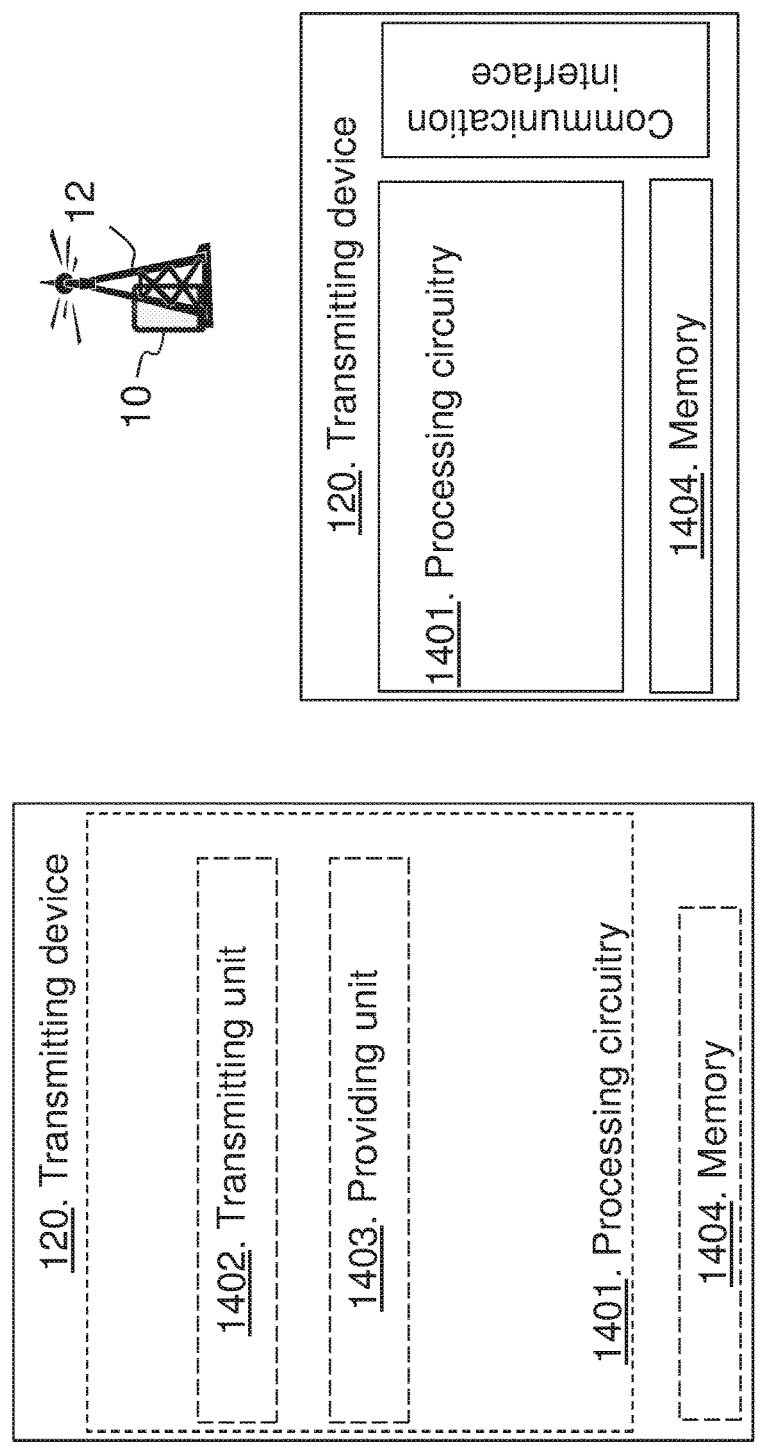
FIG. 14A is a block diagram depicting a transmitting device according to embodiments herein.

FIG. 14A is a block diagram depicting the transmitting device 120, such as the radio network node 12 or the wireless device 10, for handling communication in a wireless communications network 100 according to embodiments herein.

The first transmitting device 120 may comprise processing circuitry 1401, e.g. one or more processors, configured to perform the methods herein.

The transmitting device 120 may comprise a transmitting unit 1402. The transmitting device 120, the processing circuitry 1401, and/or the transmitting unit 1402 is configured to transmit the PTP message carrying synchronization information, such as a time stamp, to the receiving device 110 over the radio interface. The PTP message may comprise timing reference points that are defined using frame borders or a predefined position in the frame. A rate of transmission of the PTP messages may define a relationship between reference timestamp points and system frequency system frame number values. the synchronization information is carried in a timing channel over a shared channel. The shared channel may be carried over a PDSCH. The rate of transmission of the PTP message may be related to mobility of the receiving device 110.

The transmitting device 120 may comprise a providing unit 1403. The transmitting device 120, the processing circuitry 1401, and/or the providing unit 1403 may be configured to provide, to the receiving device 110, information on the status, information carrying the current time, and/or information on delay. The transmitting device 120 and/or the processing circuitry 1401 may further be configured to select DL and UL channels for synchronization and delay estimation consistently in order to achieve symmetry for a RTT delay measurement. The transmitting device 120 and/or the processing circuitry 1401 may further be configured to determine which wireless device transmission beam to use for delay estimation by using spatial relations. The transmitting device 120 and/or the processing circuitry 1401 may further be configured to not exchange the PTP messages continuously with the proviso that the transmitting device and the receiving device are in synchronization.

The transmitting device 120 further comprises a memory 1404. The memory 1404 comprises one or more units to be used to store data on, such as PTP messages, synchronization information, PDU information, system frequency SFN values, events and applications to perform the methods disclosed herein when being executed, and similar. Furthermore, the transmitting device 120 may comprise a communication interface such as comprising a transmitter, a receiver, a transceiver and/or one or more antennas.

The methods according to the embodiments described herein for the transmitting device 120 are respectively implemented by means of e.g. a computer program product 1405 or a computer program, comprising instructions, i.e., software code portions, which, when executed on at least one processor, cause the at least one processor to carry out the actions described herein, as performed by the transmitting device 120. The computer program product 1405 may be stored on a computer-readable storage medium 1406, e.g. a disc, a universal serial bus (USB) stick or similar. The computer-readable storage medium 1406, having stored thereon the computer program product, may comprise the instructions which, when executed on at least one processor, cause the at least one processor to carry out the actions described herein, as performed by the transmitting device 120. In some embodiments, the computer-readable storage medium may be a transitory or a non-transitory computer-readable storage medium. Thus, embodiments herein may disclose a transmitting device for handling communication to the receiving device in a wireless communications network, wherein the transmitting device comprises processing circuitry and a memory, said memory comprising instructions executable by said processing circuitry whereby said transmitting device is operative to to perform any of the methods herein.

FIG. 14B is a block diagram depicting the receiving device 110, such as the radio network node 12 or the wireless device 10, for handling communication in a wireless communications network 100 according to embodiments herein.

The receiving device 110 may comprise processing circuitry 1411, e.g. one or more processors, configured to perform the methods herein.

The receiving device 110 may comprise a receiving unit 1412, e.g. a receiver or a transceiver. The receiving device 110, the processing circuitry 1411, and/or the receiving unit 1412 is configured to receive the PTP message carrying synchronization information, from the transmitting device 120, over the radio interface. The receiving device 110 and/or the processing circuitry 1411 may be configured to adjust time once the PTP message is received, and wherein timing reference points are used to keep the time for long periods without the need to receive sync message payload.

The receiving device 110 may comprise an obtaining unit 1416. The receiving device 110, the processing circuitry 1401, and/or the obtaining unit 1416 may be configured to obtain from the transmitting device 120 or some other communication device, information on a status, information carrying a current time, and/or information on delay.

The receiving device 110 further comprises a memory 1413. The memory 1413 comprises one or more units to be used to store data on, such as PTP messages, synchronization information, PDU information, system frequency SFN values, events and applications to perform the methods disclosed herein when being executed, and similar. Furthermore, the receiving device 110 may comprise a communication interface such as comprising a transmitter, a receiver, a transceiver and/or one or more antennas.

The methods according to the embodiments described herein for the receiving device 110 are respectively implemented by means of e.g. a computer program product 1414 or a computer program, comprising instructions, i.e., software code portions, which, when executed on at least one processor, cause the at least one processor to carry out the actions described herein, as performed by the receiving device 110. The computer program product 1414 may be stored on a computer-readable storage medium 1415, e.g. a disc, a universal serial bus (USB) stick or similar. The computer-readable storage medium 1415, having stored thereon the computer program product, may comprise the instructions which, when executed on at least one processor, cause the at least one processor to carry out the actions described herein, as performed by the receiving device 110. In some embodiments, the computer-readable storage medium may be a transitory or a non-transitory computer-readable storage medium. Thus, embodiments herein may disclose a receiving device for handling communication to the receiving device in a wireless communications network, wherein the receiving device comprises processing circuitry and a memory, said memory comprising instructions executable by said processing circuitry whereby said receiving device is operative to to perform any of the methods herein.

In some embodiments a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included.

Designers of communications devices will appreciate the cost, performance, and maintenance trade-offs inherent in these design choices.

Some example embodiments numbered 1-18 are described below.

Embodiment 1. A method performed by a transmitting device (120), for handling communication in a wireless communications network (100), the method comprising: transmitting (1301) a Precision Time Protocol, PTP, message carrying synchronization information to a receiving device (110) over a radio interface.

Embodiment 2. The method according to Embodiment 1, further comprising:
providing (1302), to the receiving device (110), unidirectional information on a status, unidirectional information carrying a current time.

Embodiment 3. The method according to any of Embodiments 1-2, wherein the PTP message comprises timing reference points that are defined using frame borders.

Embodiment 4. The method according to any of Embodiment 1-3, wherein a rate of the PTP message defines a relationship between reference timestamp points and system frequency SFN values.

Embodiment 5. The method according to any of Embodiments 1-4, wherein the synchronization information may be carried in a timing channel over a shared channel.

Embodiment 6. The method according to Embodiment 5, wherein the shared channel is a Physical Downlink Timing Channel (PDTCH) over Physical Downlink Shared Channel (PDSCH).

Embodiment 7. A method performed by a receiving device (110), for handling communication in a wireless communications network (100), the method comprising:
receiving ( ) a Precision Time Protocol, PTP, message carrying synchronization information from a transmitting device (120) over a radio interface.

Embodiment 8. The method according to Embodiment 7, wherein time is adjusted once the PTP message is received, and wherein timing reference points are used to keep the time for long periods without the need to receive sync message payload.

Embodiment 9. A transmitting device (120), for handling communication in a wireless communications network (100), wherein the transmitting device (120) is configured to:
transmit a Precision Time Protocol, PTP, message carrying synchronization information, to a receiving device (110), over a radio interface.

Embodiment 10. The transmitting device (120) according to Embodiment 9, further being configured to:
provide, to the receiving device (110), unidirectional information on a status, unidirectional information carrying a current time.

Embodiment 11. The transmitting device (120) according to any of Embodiments 9-10, wherein the PTP message comprises timing reference points that are defined using frame borders.

Embodiment 12. The transmitting device (120) according to any of Embodiments 9-11, wherein a rate of the PTP message defines a relationship between reference timestamp points and system frequency SFN values.

Embodiment 13. The transmitting device (120) according to any of Embodiments 9-12, wherein the synchronization information is carried in a timing channel over a shared channel.

Embodiment 14. The method according to Embodiment 13, wherein the shared channel is a Physical Downlink Timing Channel (PDTCH) over Physical Downlink Shared Channel (PDSCH).

Embodiment 15. A receiving device (110) for handling communication in a wireless communications network (100), wherein the receiving device (110) is configured to:
receive a Precision Time Protocol, PTP, message carrying synchronization information, from a transmitting device (120), over a radio interface.

Embodiment 16. The receiving device (110) according to Embodiment 15, wherein time is adjusted once the PTP message is received, and wherein timing reference points are used to keep the time for long periods without the need to receive sync message payload.

Embodiment 17. A computer program comprising instructions, which when executed by a processor, causes the processor to perform actions according to any of the Embodiments 1-6 or according to any of the Embodiments 7-8.

Embodiment 18. A carrier comprising the computer program of Embodiment 17, wherein the carrier is one of an electronic signal, an optical signal, an electromagnetic signal, a magnetic signal, an electric signal, a radio signal, a microwave signal, or a computer-readable storage medium.

Figure 15:
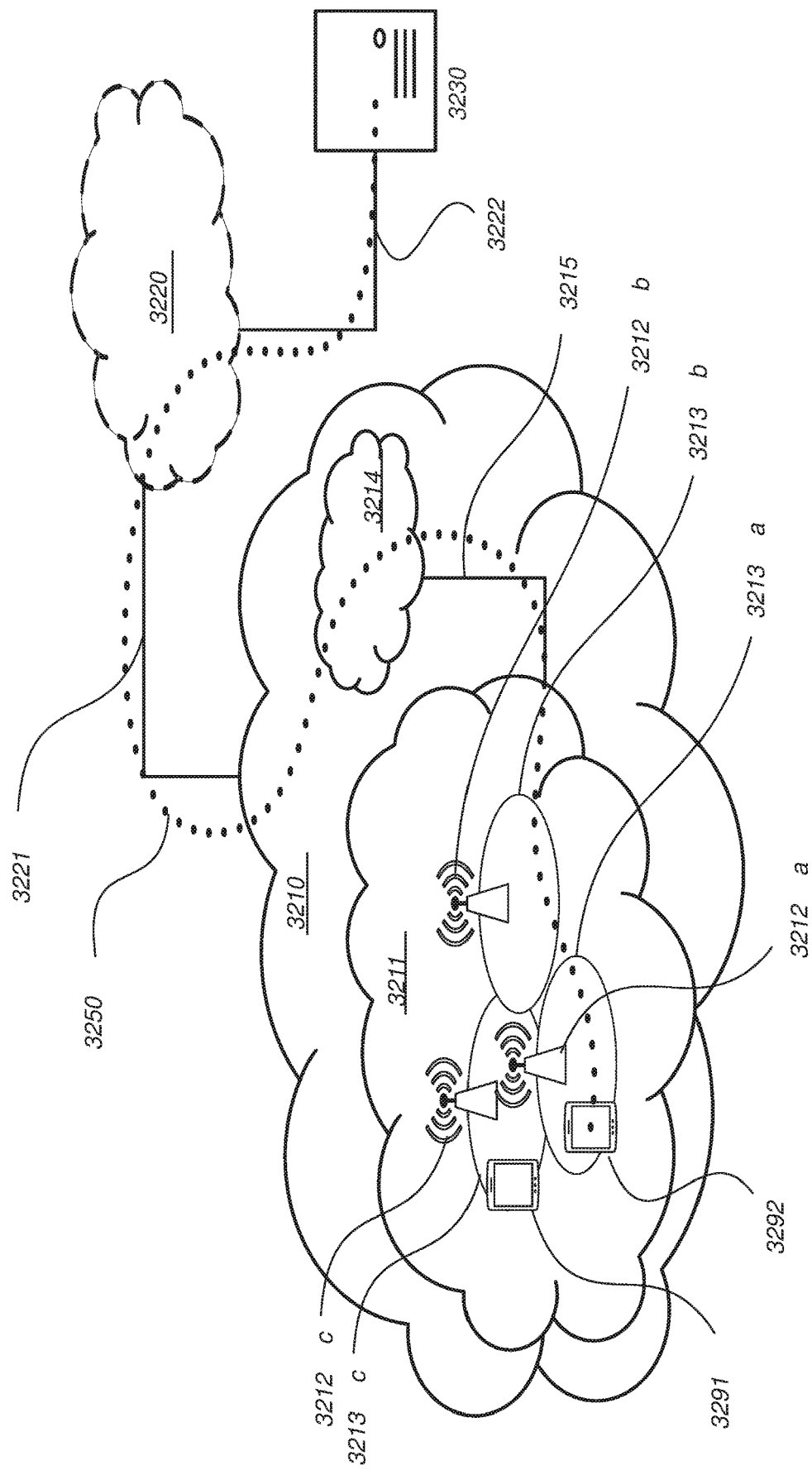
FIG. 15 is a telecommunication network connected via an intermediate network to a host computer in accordance with some embodiments.

FIG. 15 shows a Telecommunication network connected via an intermediate network to a host computer in accordance with some embodiments. With reference to FIG. 15, in accordance with an embodiment, a communication system includes telecommunication network 3210, such as a 3GPP-type cellular network, which comprises access network 3211, such as a radio access network, and core network

3214. Access network 3211 comprises a plurality of base stations 3212a, 3212b, 3212c, such as NBs, eNBs, gNBs or other types of wireless access points being examples of the radio network node 12 above, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example being examples of the wireless device 10 above, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 15 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Figure 16:
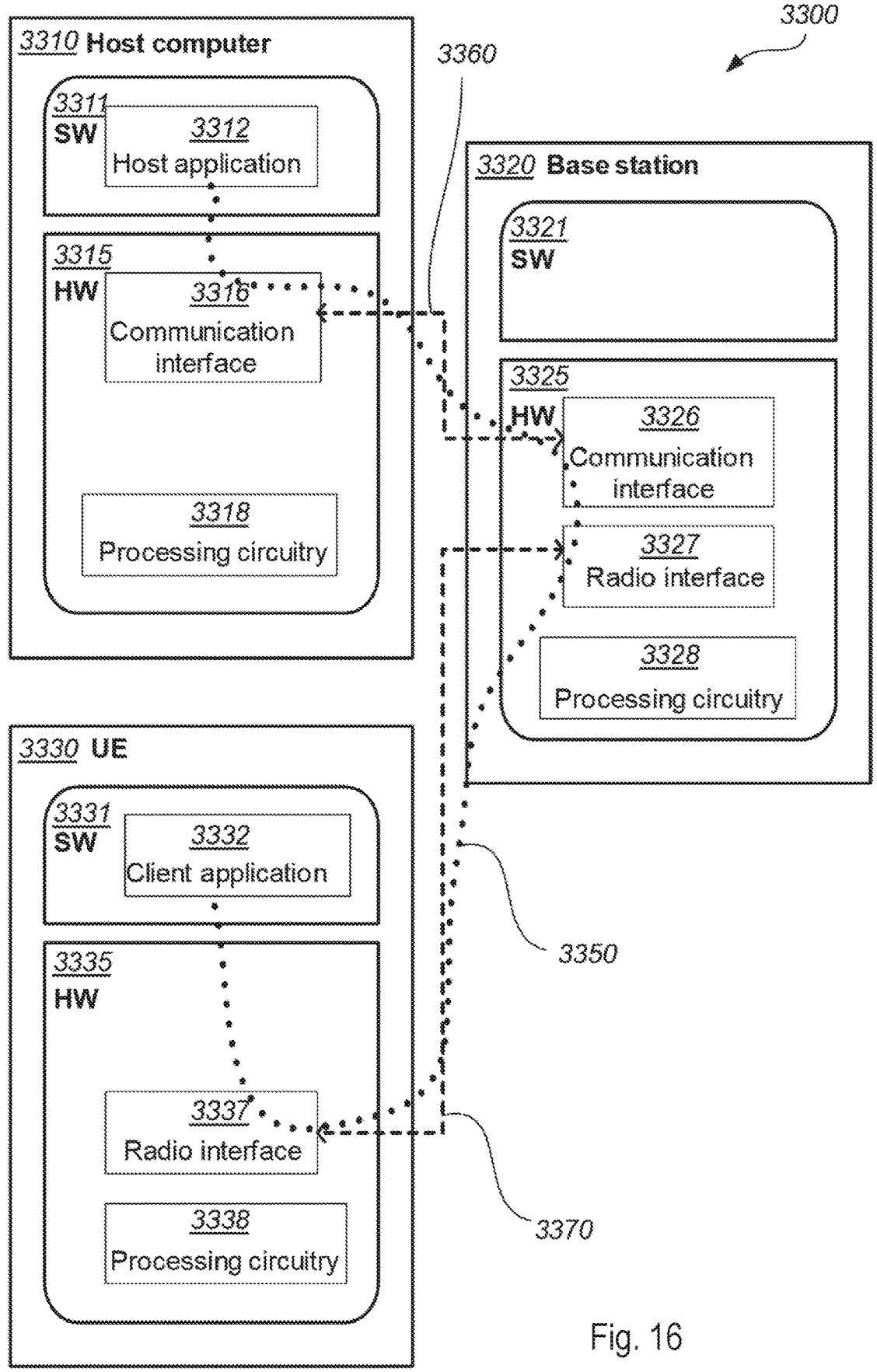
FIG. 16 is a host computer communicating via a base station with a user equipment over a partially wireless connection in accordance with some embodiments.

FIG. 16 shows a host computer communicating via a base station and with a user equipment over a partially wireless connection in accordance with some embodiments Example implementations, in accordance with an embodiment, of the UE, base station and host computer discussed in the preceding paragraphs will now be described with reference to FIG. 16. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 16) served by base station 3320. Communication interface 3326 may be configured to facilitate connection 3360 to host computer 3310. Connection 3360 may be direct or it may pass through a core network (not shown in FIG. 16) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. It's hardware 3333 may include radio interface 3337 configured to set up and maintain wireless connection 3370 with a base station serving a coverage area in which UE 3330 is currently located. Hardware 3333 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 16 may be similar or identical to host computer 3230, one of base stations 3212a, 3212b, 3212c and one of UEs 3291, 3292 of FIG. 15, respectively. This is to say, the inner workings of these entities may be as shown in FIG. 16 and independently, the surrounding network topology may be that of FIG. 15.

In FIG. 16, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency since synchronization is enabled in a standardized manner and thereby provide benefits such as reduced waiting time and better responsiveness.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3333 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

FIG. 17 shows methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIG. 15 and FIG. 16. For simplicity of the present disclosure, only drawing references to FIG. 17 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

FIG. 18 shows methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIG. 15 and FIG. 16. For simplicity of the present disclosure, only drawing references to FIG. 18 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figures 19, 20:
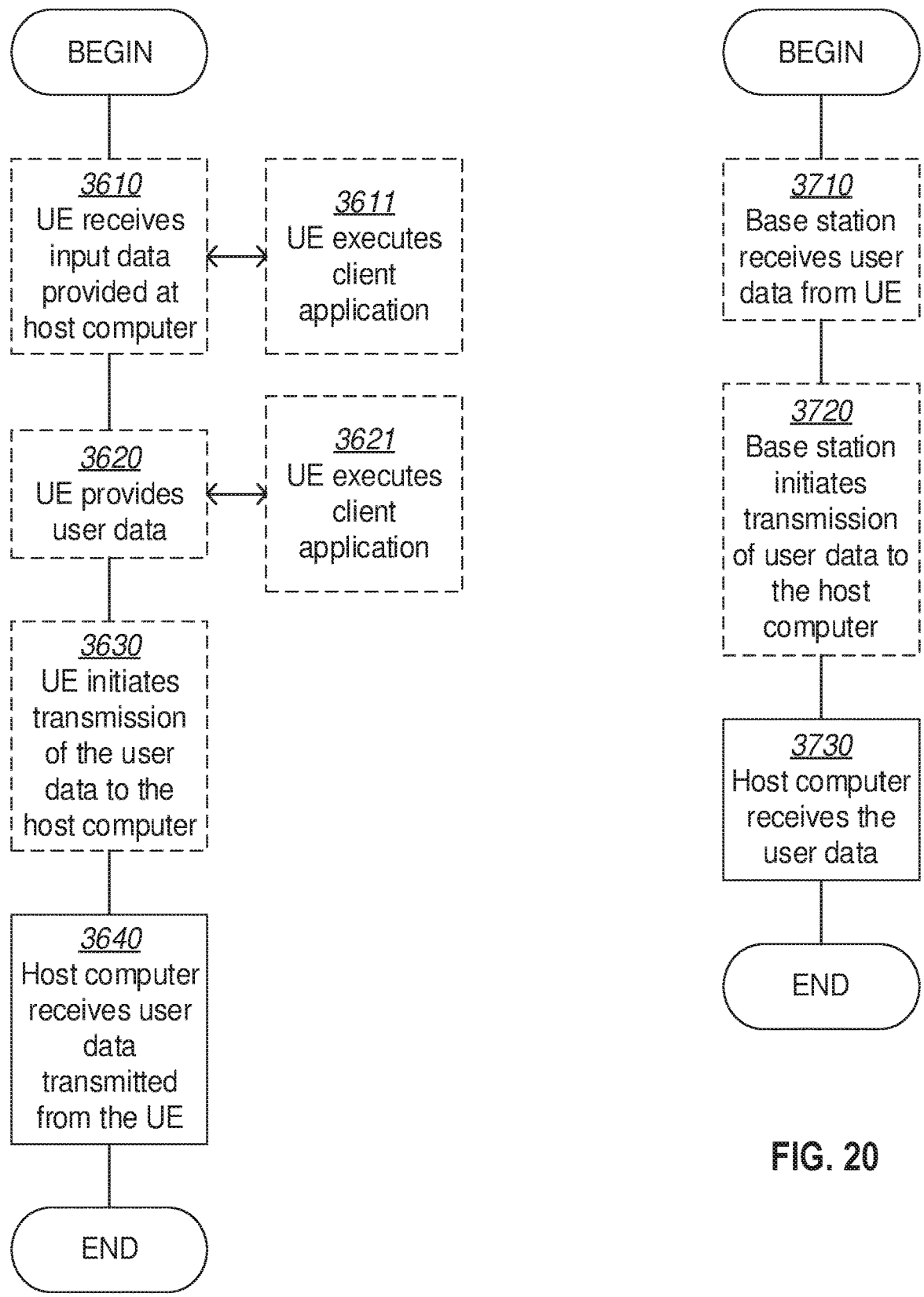
FIG. 19 is methods implemented in a communication system including a host computer, a base station and a user equipment in accordance with some embodiments.
FIG. 20 is methods implemented in a communication system including a host computer, a base station and a user equipment in accordance with some embodiments.

FIG. 19 shows methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIG. 15 and FIG. 16. For simplicity of the present disclosure, only drawing references to FIG. 19 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

FIG. 20 show methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station and a UE which may be those described with reference to FIG. 15 and FIG. 16. For simplicity of the present disclosure, only drawing references to FIG. 20 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

Abbreviation Explanation

3GPP 3rd Generation Partnership Project
DL Downlink
DCI Downlink control information
DRX Discontinuous Reception
DTX Discontinuous Transmission
eDRX extended Discontinuous Reception
eMTC enhanced Machine-Type Communications
eNB Evolved NodeB
PDU Protocol Data Unit
RRC Radio Resource Control (protocol)
SI System Information
SF Subframe
SN Sequence number
UE User Equipment
UL Uplink
WI Work Item

REFERENCES

[1] IEEE 1588-2018/D1.4, "Draft Standard for a Precision Clock Synchronization Protocol for Networked Measurement and Control Systems."
[2] ITU-T G.8271, Time Synchronization aspects in Telecommunication networks
[3] ITU-T G.8275.1, "Precision time protocol telecom profile for phase/time synchronization with full timing support from the network."
[9] 3GPP TR 38.874 (Study on Integrated Access and Backhaul)
[10] 3GPP TS 38.104, Base Station (BS) radio transmission and reception (Release 15)
[11] 3GPP TS 38.133, Requirements for support of radio resource management (Release 15)
[12] 3GPP TR 22.804, Study on Communication for Automation in Vertical domains (CAV)
[13] IEEE 802.1AS (Draft 7.3-2018)
[14] S2-1811828, "TSN—Definition of potential Impacts on Existing Nodes and Functionality of 5GS bridge model", Nokia

The invention claimed is:

1. A method performed by a transmitting device, for handling communication in a wireless communications network, the method comprising:
   transmitting a Precision Time Protocol, PTP, message carrying synchronization information to a receiving device over a radio interface; and
   not exchanging the PTP messages continuously with the proviso that the transmitting device and the receiving device are in synchronization.

2. The method according to claim 1, further comprising:
   providing, to the receiving device, information on a status, information carrying a current time and/or information of delay.

3. The method according to claim 1, wherein the PTP message comprises timing reference points that are defined using frame borders or a predefined position in a frame.

4. The method according to claim 1, wherein a rate of transmission of the PTP message defines a relationship between reference timestamp points and system frequency number, SFN, values.

5. The method according to claim 1, further comprising selecting downlink, DL, and uplink, UL, channels for synchronization and delay estimation consistently in order to achieve symmetry for a round trip time, RTT, delay measurement.

6. The method according to claim 1, further comprising determining which wireless device transmission beam to use for delay estimation by using spatial relations.

7. The method according to claim 1, wherein a rate of transmission of the PTP message is related to mobility of the receiving device.

8. A method performed by a receiving device, for handling communication in a wireless communications network, the method comprising:
   receiving a Precision Time Protocol, PTP, message carrying synchronization information from a transmitting device over a radio interface; and
   not exchanging the PTP messages continuously with the proviso that the transmitting device and the receiving device are in synchronization.

9. The method according to the claim 8, wherein time is adjusted once the PTP message is received, and wherein timing reference points are used to keep the time for periods without the need to receive sync message payload.

10. A non-transitory computer medium comprising instructions, which when executed by a processor, causes the processor to transmit a Precision Time Protocol, PTP, message carrying synchronization information to a receiving device over a radio interface; and not exchange the PTP messages continuously with the proviso that the transmitting device and the receiving device are in synchronization.

11. A transmitting device, for handling communication in a wireless communications network, wherein the transmitting device comprises a communication interface and processing circuitry associated with the communication interface, the processing circuitry configured to:

transmit a Precision Time Protocol, PTP, message carrying synchronization information to a receiving device over a radio interface; and not exchange the PTP messages continuously with the proviso that the transmitting device and the receiving device are in synchronization.

12. The transmitting device according to claim 11, wherein the PTP message comprises timing reference points that are defined using frame borders or a predefined position in a frame.

13. The transmitting device according to claim 11, wherein a rate of transmission of the PTP message defines a relationship between reference timestamp points and system frequency number, SFN, values.

14. The transmitting device according to claim 11, wherein the processing circuitry is further configured to select downlink, DL, and uplink, UL, channels for synchronization and delay estimation consistently in order to achieve symmetry for a round trip time, RTT, delay measurement.

15. The transmitting device according to claim 11, wherein the processing circuitry is further configured to determine which wireless device transmission beam to use for delay estimation by using spatial relations.

16. The transmitting device according to claim 11, wherein a rate of transmission of the PTP message is related to mobility of the receiving device.

17. A receiving device for handling communication in a wireless communications network, wherein the receiving device comprises a communication interface and processing circuitry associated with the communication interface, the processing circuitry configured to:

receive a Precision Time Protocol, PTP, message carrying synchronization information from a transmitting device over a radio interface; and not exchange the PTP messages continuously with the proviso that the transmitting device and the receiving device are in synchronization.

18. The receiving device according to the claim 17, wherein the processing circuitry is configured to adjust time once the PTP message is received, and wherein timing reference points are used to keep the time for long periods without the need to receive sync message payload.

* * * * *